(12) United States Patent
Holt et al.

(10) Patent No.: US 8,699,941 B1
(45) Date of Patent: Apr. 15, 2014

(54) INTERACTIVE LEARNING MAP

(75) Inventors: Laurence Holt, Brooklyn, NY (US); George Schneiderman, New York, NY (US); Lawrence Jason Berger, New York, NY (US)

(73) Assignee: Amplify Education, Inc., New York, NY (US)

( * ) Notice: Subject to any disclaimer, the term of this patent is extended or adjusted under 35 U.S.C. 154(b) by 0 days.

(21) Appl. No.: 13/270,612

(22) Filed: Oct. 11, 2011

Related U.S. Application Data

(60) Provisional application No. 61/391,533, filed on Oct. 8, 2010.

(51) Int. Cl.
 *G09B 7/00* (2006.01)
 *G06Q 99/00* (2006.01)

(52) U.S. Cl.
 USPC .......................................... 434/362; 705/317

(58) Field of Classification Search
 USPC .................. 434/322, 323, 350–353, 362
 See application file for complete search history.

(56) References Cited

U.S. PATENT DOCUMENTS

| | | | |
|---|---|---|---|
| 6,652,287 B1 | 11/2003 | Strub et al. | |
| 7,217,134 B2 * | 5/2007 | Hansen et al. | 434/322 |
| 2003/0039948 A1 | 2/2003 | Donahue | |
| 2006/0014129 A1 | 1/2006 | Coleman et al. | |
| 2006/0024654 A1 | 2/2006 | Goodkovsky | |
| 2006/0172274 A1 | 8/2006 | Nolasco | |
| 2008/0096171 A1 | 4/2008 | Movahhedi | |
| 2008/0124696 A1 * | 5/2008 | Houser et al. | 434/350 |
| 2010/0075288 A1 * | 3/2010 | Sareday | 434/322 |
| 2010/0075291 A1 * | 3/2010 | DeYoung et al. | 434/350 |
| 2010/0159433 A1 * | 6/2010 | Graham et al. | 434/353 |
| 2010/0190145 A1 | 7/2010 | Singer et al. | |
| 2010/0316986 A1 | 12/2010 | de la Chica et al. | |
| 2011/0065082 A1 * | 3/2011 | Gal et al. | 434/365 |
| 2011/0212430 A1 * | 9/2011 | Smithmier et al. | 434/322 |
| 2011/0223575 A1 * | 9/2011 | Yueh et al. | 434/351 |
| 2011/0307396 A1 * | 12/2011 | Hewitt et al. | 705/317 |
| 2011/0318722 A1 * | 12/2011 | Giridharan | 434/322 |
| 2012/0094266 A1 * | 4/2012 | Lynch et al. | 434/362 |

OTHER PUBLICATIONS

New York State P-12 Common Core "Learning Standards for Mathematics," Retrieved on Jul. 26, 2012, 83 pages.

\* cited by examiner

*Primary Examiner* — Robert J Utama
*Assistant Examiner* — Sadaruz Zaman
(74) *Attorney, Agent, or Firm* — Fish & Richardson P.C.

(57) ABSTRACT

One or more learning map interfaces are displayed. The learning map interfaces include a selection control configured to allow a user to select a subset of assessments from a set of assessments. The subset includes less assessments than the set. Performance information for a student is determined based on the subset of assessments. A learning map is populated with the performance information for the student. The learning map includes a plurality of cells. Each cell corresponds to a learning objective. The plurality of cells is arranged in a manner that reflects a relationship between the learning objectives corresponding to the cells. One or more learning map interfaces are displayed. The learning map interfaces are configured to display the learning map populated with the performance information.

16 Claims, 18 Drawing Sheets

INTERACTIVE LEARNING MAP

CROSS REFERENCE TO RELATED APPLICATIONS

This application claims priority from U.S. Provisional Application No. 61/391,533, filed Oct. 8, 2010, and titled "Interactive Learning Map," the entire contents of which are hereby incorporated by reference.

FIELD

This document relates to educational software.

BACKGROUND

In an educational setting, such as elementary or secondary school, a set of learning objectives can be identified for a class or other group of students. The identified learning objectives may, for example, be part of one or more academic standards imposed by a nation, a state, a district, or some other entity. The learning objectives included in a standard may be predetermined by teachers, administrative staff, school districts, or an expert on teaching the relevant subject matter. A teacher or other staff member can administer an assessment to determine, for each student in a class, a respective student's abilities with respect to one or more learning objectives that are covered by the assessment. Evaluation of a student's progress towards acquiring a given learning objective may be based on a student's performance on one or more assessment items pertaining to the corresponding learning objective.

SUMMARY

In a first aspect, a computing system includes one or more processing devices and one or more storage devices storing instructions that are executed by the one or more processing devices. The instructions, when executed, cause the one or more processing devices to display one or more learning map interfaces. The learning map interfaces include a selection control configured to allow a user to select a subset of assessments from a set of assessments. The subset includes less assessments than the set. The instructions, when executed, cause the one or more processing devices to determine performance information for a student based on the subset of assessments. The instructions, when executed, cause the one or more processing devices to populate a learning map with the performance information for the student. The learning map includes a plurality of cells. Each cell corresponds to a learning objective. The plurality of cells is arranged in a manner that reflects a relationship between the learning objectives corresponding to the cells. The instructions, when executed, cause the one or more processing devices to display one or more learning map interfaces. The learning map interfaces are configured to display the learning map populated with the performance information.

In a second aspect, a method includes displaying one or more learning map interfaces. The learning map interfaces include a selection control configured to allow a user to select a subset of assessments from a set of assessments. The subset includes less assessments than the set. The method includes determining performance information for a student based on the subset of assessments. The method includes populating a learning map with the performance information for the student. The learning map includes a plurality of cells. Each cell corresponds to a learning objective. The plurality of cells are arranged in a manner that reflects a relationship between the learning objectives corresponding to the cells. The method includes displaying one or more learning map interfaces. The learning map interfaces are configured to display the learning map populated with the performance information.

Implementations of the foregoing aspects can include any, all, or none of the following features. The selection control can include representations of the assessments in the set of assessments such that the user can select the representations to select the subset of assessments. The selection control can include a timeline control that allows a user to select a time such that assessments in the set of assessments administered to the student after the selected time are included in the subset of assessments and assessments in the set of assessments before the selected time are not included in the subset. The subset of assessments can include multiple, different types of assessments. Populating the learning map with performance information can include accessing a set of assessment scores corresponding to assessment items administered to the student on the assessments in the subset of assessments. The assessment items can correspond to a particular one of the learning objectives. Populating the learning map with performance information can include: applying weights to the accessed assessment scores to generate weighted assessment scores; determining a performance level, from among multiple performance levels, of the student based on the weighted assessment scores; and modifying the cell corresponding to the particular learning objective to include an indication of the determined performance level. The weights can vary based on a time at which the assessment items were administered to the student. The weights can vary based on a difficulty of the assessments items. The weights can vary based on an importance of the assessment on which the assessment items were administered. The weights can vary based on how well the assessment items differentiate mastery levels. Determining performance information for a student based on the subset of assessments can include determining a first performance level, from among multiple performance levels, of the student based on a first set of assessment items corresponding to a first one of the learning objectives. The first set of assessment items can be included in a first set of assessments in the subset of assessments. Determining performance information for a student based on the subset of assessments can include determining a second performance level, from among the multiple performance levels, of the student based on a second set of assessment items corresponding to a second one of the learning objectives. The second set of assessment items can be included in a second set of assessments in the subset of assessments. The first set of assessments can include at least one different assessment than the second set of assessments. Populating a learning map with the performance information for the student can include modifying a first one of the cells to include a first indication of the first performance level. The first cell can correspond to the first learning objective. Populating a learning map with the performance information for the student can include modifying a second one of the cells to include a second indication of the second performance level. The second cell can correspond to the second learning objective. The subset of assessments can include multiple, different types of assessments.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

BRIEF DESCRIPTION OF THE DRAWINGS

FIGS. 2A-2K and 3A-4B illustrate screenshots of an example of a user interface employing an interactive learning map.

DETAILED DESCRIPTION

Figure 1:
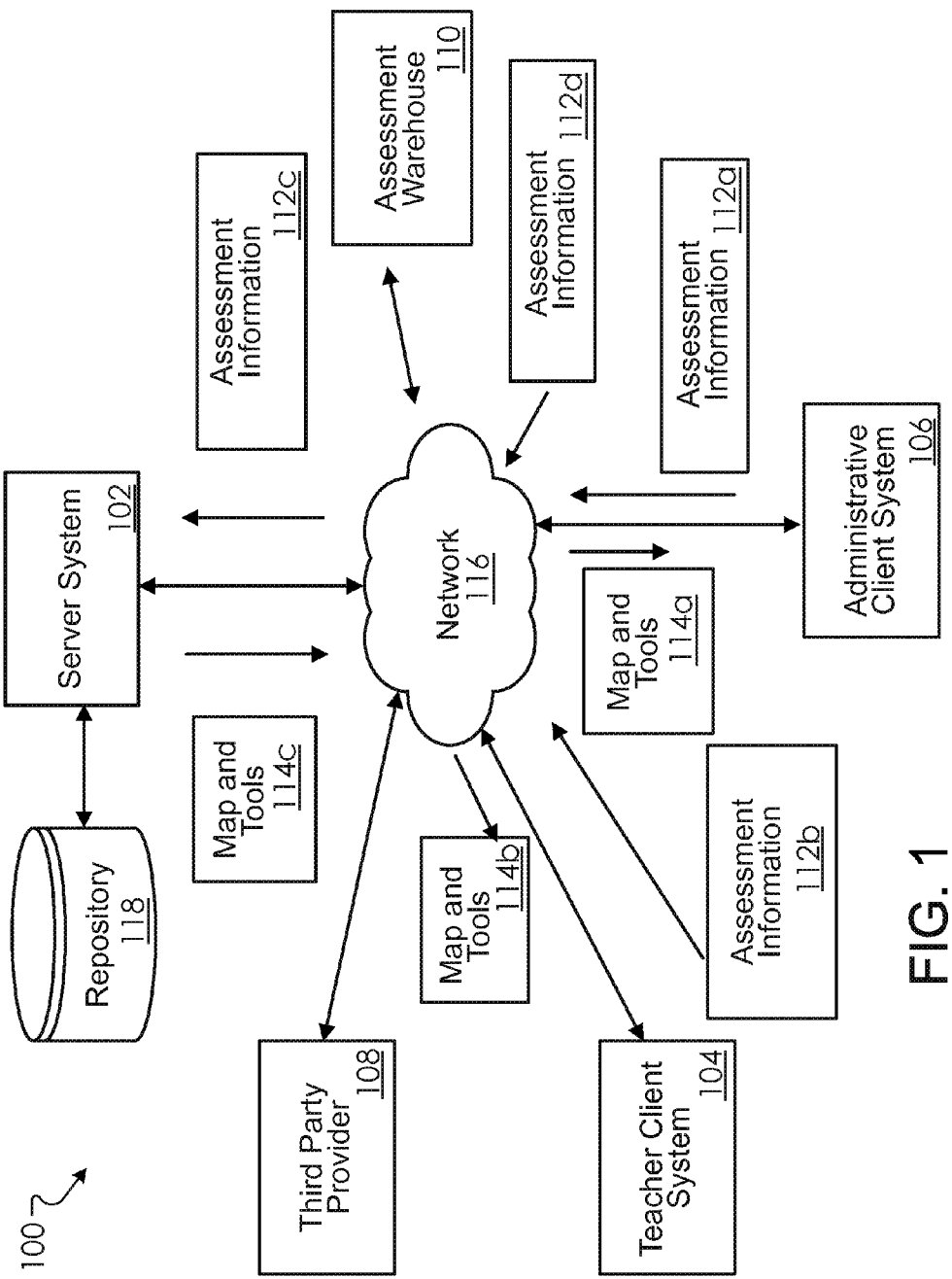
FIG. 1 illustrates an example of a system for generating and displaying interactive learning maps.

FIG. 1 illustrates an example of a system 100 for generating and displaying one or more interactive tools for evaluating, planning, and reporting activities undertaken by students and/or teachers. For example, a learning map may represent various learning objectives that are to be obtained by students, and a relationship among those learning objectives (e.g., a progression of the learning objectives). In general, a learning map may be composed of a plurality of cells, with each cell corresponding to a learning objective and the plurality of cells may be arranged in a manner that reflects a relationship between the learning objectives corresponding to the cells. Each learning objective may encompass, for example, one or more skills (things that students need to be able to do), one or more concepts (things students need to understand), and/or one or more facts (things students need to memorize).

In some implementations, the learning map can provide feedback in an interactive interface regarding one or more student's progress toward achieving one or more of the learning objectives. Additionally, the learning map may provide other feedback to students, parents, administrative staff, school district staff, state or national entities, or other party interested in analyzing student and/or teacher performance. The provided feedback can include learning objective requirements, performance scores and statistics, charts and other graphics, procedure details, and teacher information, among other data.

Referring to FIG. 1, the system 100 includes a server system 102, a teacher client system 104, an administrative client system 106, one or more third party providers 108, and an assessment warehouse 110. In general, various components of the system 100 can store or transmit data pertaining to assessments of students. For example, a teacher can administer assessments to determine a student's abilities with respect to certain learning objectives, and input the results of the assessments into the teacher client system 104 to transmit the results to other parts of system 100, such as server system 102 or assessment warehouse 110. As another example, a student client system (not shown) can be used to administer an assessment to a student, capture the results, and send the results to other parts of the system 100. As yet another example, assessments may be administered by teachers, but then evaluated or graded by a third party service that stores the results of the assessments in the assessment warehouse 110 and makes the assessment results available, for example, to the server system 102.

The assessments may include diagnostic assessments used to determine a baseline for a student's ability in one or more learning objectives, formative assessments to determine learning gaps throughout a particular time period, and/or summative assessments to determine a level of understanding achieved at the end of a particular time period. Assessment data may be used by the server system 102 to generate and provide learning maps that reflect one or more students' performance on assessment items for one or more learning objectives represented by the learning maps.

Each of the client systems 104 and 106, third party providers 108, the assessment warehouse 110, and the server system 102 may be implemented using, for example, a general-purpose computer capable of responding to and executing instructions in a defined manner, a personal computer, a special-purpose computer, a workstation, a server, or a mobile device. Client systems 104 and 106, third party providers 108, assessment warehouse 110, and server system 102 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by client systems 104 and 106, third party providers 108, assessment warehouse 110, and server system 102.

In the example shown in FIG. 1, the system 100 includes client systems 102 and 104. However, in other implementations, there may be more or fewer client systems. Similarly, a single server system 102 is depicted in FIG. 1; however, in other implementations there may be more than one server system 102. For example, each of the systems 104 and 106 may retrieve data over network 116. The data may include, but is not limited to assessment information 112 (e.g., 112a-112c) or map and tool information 114 (e.g., 114a-c) from third party providers 108 and/or assessment warehouse 110 to generate, display, or report assessment data for a user. In some implementations, information 112 and 114 can represent data for any number of students which can be combined or aggregated by the system 100 according to user preferences and/or system requirements.

The assessment information 112 can include multiple, different types of assessment information. For example, the assessment information 112 can include information for interim assessments, state assessments tests, national assessment tests, homework assignments, classwork assignments, class quizzes, diagnostic assessments, formative assessments, summative assessments, end of chapter tests or quizzes, exit ticket assessments, or other types of assessments. An exit ticket assessment is an assessment which can be used to ensure that students have mastered a skill before proceeding to other material.

The server system 102 may include a web server configured to provide a web-based application that provides interactive tools for evaluating one or more students' progress toward acquiring one or more of the learning objectives, developing one or more plans for providing instructional material to students with respect to the one or more learning objectives, and/or for developing custom interfaces for such evaluation and planning, as described further below. Assessment of a student's progress towards acquiring a given learning objective may be based on a student's performance on one or more assessment items pertaining to the corresponding learning objective. The learning objectives may be part of one or more academic standards imposed by a nation, a state, a district, or other entity. The learning objectives included in a standard may be predetermined by teachers, administrative staff, school districts, or an expert on teaching the relevant subject matter.

One example set of standards includes the state of New York's "Learning Standards for Mathematics." Each standard in the set may include one or more particular learning objectives and each such learning objective may be able to be assessed using numerous measurable activities. For example, one of the learning objectives in the New York standards (6.N.1) requires a student be able to read and write whole numbers into the trillions. While one genre of standards is discussed in this disclosure, other genres can be deployed throughout system 100, including combinations of standards and third party standards.

The server system 102 may include an application server which hosts one or more application program interfaces (APIs) to provide academic assessment tools to users. The server 102 may provide services, hardware resources, and software framework to host services. In some implementations, the server 102 can implement both server-based and client-based Web applications. For example, the application server 102 can provide server applications (e.g., online services or portals) in a development environment or in an external tool.

The server system 102 can provide access to a number of resources for system 100. For example, the server system 102 can store assessment data in a repository 118. The assessment data may include external results from standardized testing. In some implementations, assessment data may include data captured and stored in learning map structures. For example, the repository 118 may store individual student records, standards, and teacher plans.

The teacher client system 104 can provide one or more user interfaces for teachers to employ. In some implementations, the teacher client system 104 can provide user interfaces for further analysis of students or classes. The further analysis may include creating plans to teach, re-teach, or review particular learning objectives in the classroom.

The administrative client system 106 can provide administrative level access to one or more administrators. For example, a principal or school district manager may access learning maps, teacher plans, and student data through the administrative client system 106. In this fashion, an administrator can oversee teacher and student actions. In some implementations, the administrator may use the administrative client system 106 for reporting purposes to report out on school or district performance. As another example, the teacher client system 104 can provide a learning map builder user interface. The learning map builder interface can be used to create a learning map with learning objectives selected by a teacher or an administrator.

The third party providers 108 may include service and/or content providers who provide resources for teachers and other administrative staff. For example, a third party provider may distribute materials including examples of how to teach different learning objectives. The materials may pertain to a specific learning objective, standard, location, or vendor. In some implementations, third party materials can be provided for a particular cost. In some implementations, third party providers can provide information free of charge.

The assessment warehouse 110 may store assessment data for a number of students. The assessment data may include the students' answers to assessment items that assess the student's abilities with respect to various learning objectives, whether or not the students answered those assessment items correctly, and other information such as standardized testing scores, student records, teacher data, learning map structures, and other system information. The assessment warehouse 110 may act as a repository for certain assessments administered by teachers, but scored by third party services, such as standardized tests.

At a high level, the system 100 can receive assessment data at server system 102. The assessment data may be received from any or all of the assessment warehouse 110, the teacher client system 104, or administrative client system 106 over network 116, for example. The received assessment data can be stored in repository 118 for future use. The stored assessment data can be retrieved from repository 118 to populate a learning map with performance information related to one or more students. For example, the server system 102 can use the stored data to populate and present a learning map and associated tools to the teacher client system 104 and/or the administrative client systems 106. The learning map may be populated by modifying one or more of the cells in the learning map to include an indication of a performance level, from among multiple performance levels, of one or more students. In addition, or as an alternative, the server system may provide learning map design tools to the teacher client system 104 and/or the administrative client system 106.

In some implementations, a single assessment, or a number of assessments of the same type, may be used to populate the cells with performance information. Alternatively, or additionally, multiple, different types of assessments may be used to populate more of the cells in the learning map than could be done, for example, with a single assessment (or group of assessments of the same type). In other words, multiple, different types of assessments may cover additional learning objectives than would be covered by a single assessment and, therefore, can be used to populate more cells. Alternatively, or additionally, as described in more detail below, multiple, different types of assessments can be used to determine which performance indication with which a given the cell is populated.

In some implementations, system 100 is a distributed client/server system that spans one or more networks such as network 116. In such cases, the various components—such as systems 102-110—may communicate via a virtual private network (VPN), Secure Shell (SSH) tunnel, or other secure network connection. Accordingly, rather than being delivered as packaged software, system 100 may represent a hosted solution that may scale cost-effectively and help drive faster adoption. In this case, portions of the hosted solution may be developed by a first entity, while other components are developed by a second entity. In such embodiments, data may be communicated or stored in an encrypted format using any standard or proprietary encryption algorithm. This encrypted communication may be between the user (or the application or client) and the host or amongst various components of the host. Put simply, communication or other transmission between any modules and/or components may include any encryption, export, translation, or data massage, compression, and so forth as appropriate. Further, system 100 may store some data at a relatively central location (e.g., accessible over a WAN), while concurrently maintaining local data at the user's site for redundancy and to allow processing during downtime.

FIGS. 2A-2K illustrate screenshots of an example of learning map user interfaces that display an interactive learning map and associated tools. The user interfaces, and underlying application, may be provided by server system 102 as a web-based application, with the interface displayed, for example, on the teacher client system 104, administrative client system 106, or other system with the appropriate permissions. More generally, in various implementations, the user interfaces may be implemented using a web application running in a web browser or other networked application, using a standalone application, or a combination of both.

The user interfaces can be used for evaluating student performance with respect to particular learning objectives, and may provide tools for planning teaching methods, aggregating performance metrics, reviewing statistics, and providing feedback in a visual and interactive manner. The user interfaces can generally display one or more learning maps with varying levels of detail. The detail may include text, icons, colors, shapes, symbols, fields, functional buttons or controls, links, indicators, or other preconfigured or user-entered data. The material depicted in FIGS. 2A-2K may build upon one or more previous screenshots. However, in other implementations, each screenshot may be generated and/or navigated to without viewing a previous screenshot.

Figure 2A:
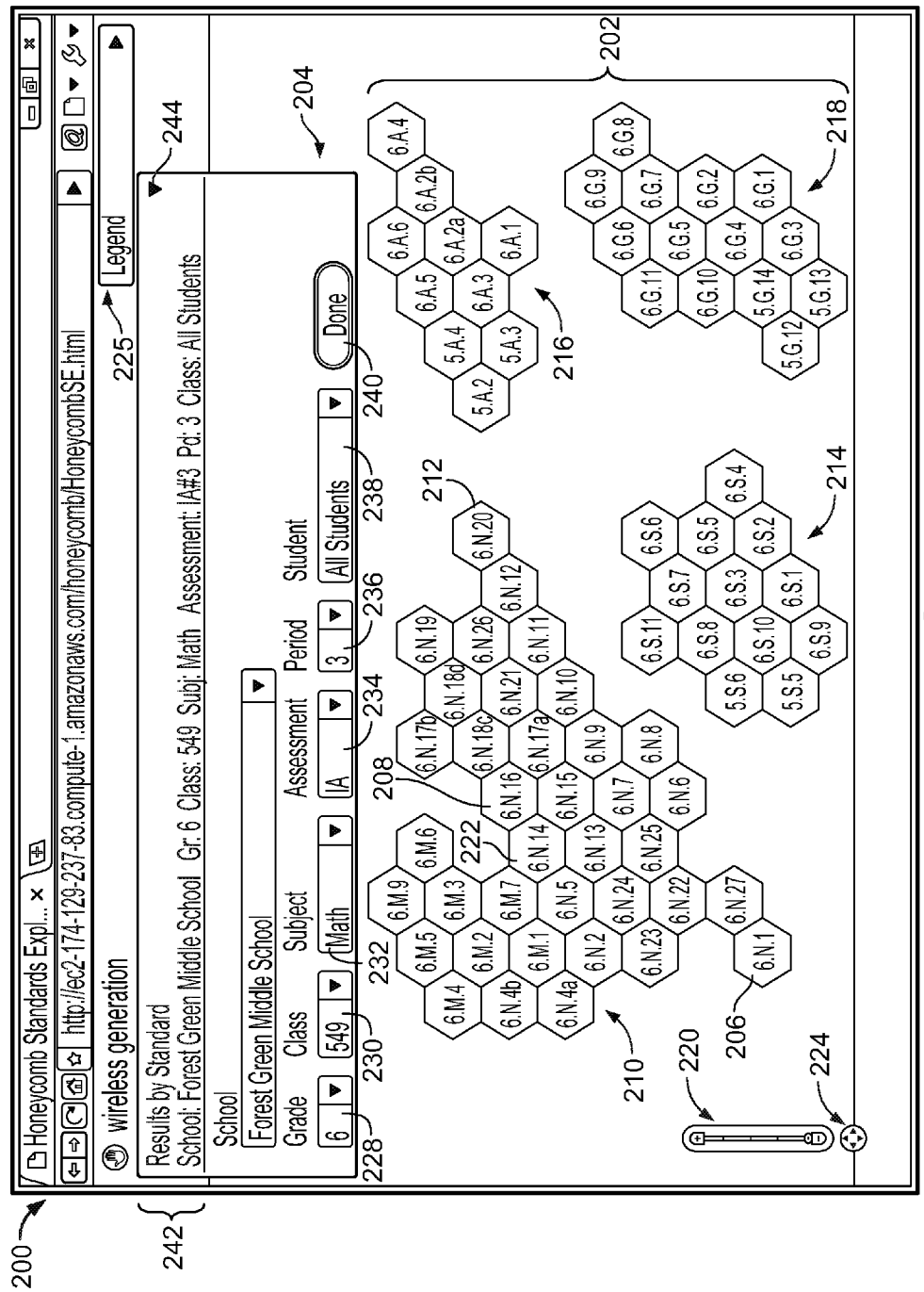

Referring now to FIG. 2A, a screenshot depicts an example of a user interface 200 displaying an interactive learning map. The user interface 200 includes a learning map graphic 202 and an assessment toolbar 204. The learning map graphic 202 represents a number of learning objectives which are represented by cells. The cells shown in the learning map graphic 202 are shaped into hexagons connected to a number of other hexagons which form one or more honeycomb-like shapes. Each individual honeycomb may represent an individual learning map structure. In some implementations, each learning map structure depicts a grouping of learning objectives for a particular subject matter, such as math problem solving, comprehension, or communication, just to name a few examples. For example, the learning structures 210, 214, 216, and 218 together represent fifth and sixth grade math learning objectives according to the state of New York's math standards. Although the cells are depicted as hexagons connected into honeycomb-like shapes in screenshots 2A-2K, other shapes or configurations are possible.

Each cell may represent a learning objective. In some implementations, a learning objective may be a learning objective in an educational standard, such as the objective (6.N.1) shown in cell 206. Educational standards may include particular learning objectives that are to be acquired by a student or group of students. For example, the objective (6.N.1) corresponds to a learning objective for reading and writing whole numbers to the trillions. Similarly, a cell 208 represents a learning objective (e.g., 6.N.16) pertaining to adding and subtracting fractions with unlike denominators.

The cells can be arranged in a manner that reflects a relationship between the learning objectives corresponding to the cells with, for instance, connections between the cells indicating particular relationships or commonalities between learning objectives. For example, the layout or arrangement of the cells may visually indicate a progression of learning objectives that reflect a path of typical development of students with respect to the learning objectives. The progression of learning objectives may begin with learning objectives that are considered to be more fundamental and which therefore form the basis for understanding higher level learning objectives. In some examples, fundamental learning objectives are generally placed to the left and bottom of a learning map structure. This can provide a base with which to build upon. Namely, higher level learning objectives (represented in cells) can be stacked upon the fundamental learning objectives. Thus, as a user moves from left-bottom to top-right within the learning map structure, the user can proceed to learning objectives that build upon the previous learning objectives. Thus, for example, the cells form a learning map structure beginning with a fundamental learning objective (e.g., 6.N.1) in cell 206 and ending with a higher level learning objective (e.g., 6.N.20) in cell 212. Each individual learning map structure 214, 216, and 218 represents other learning maps pertaining to different standards and learning objectives.

In some implementations, the progression of learning objectives from left-bottom to top-right may indicate a level of difficulty increase between learning objectives. In this example, the difficulty level of each corresponding learning objective captured in a cell may increase as the learning map structure extends upward and/or outward. As such, the learning objective captured in cell 208 may be more difficult than the learning objective captured in cell 206.

Each cell can display a number of levels of detail depending on the zoom level or user selections. In the user interface 200, each cell depicts a first level of detail that includes a coded identifier of the corresponding learning objective in, for example, a particular format (e.g., X.Y.Z). The coded identifier indicates a corresponding learning objective from a set of learning objectives. In some implementations, the first level of detail shows the cell with only an indication of the corresponding learning objective (for example, the coded identifier) and an indication of the level of performance of one or more students on one or more assessments of the corresponding learning objective (for instance, using the color coding described below). In some implementations, a user can zoom using a zoom toolbar 220 to view more or less detail in, on, or around each cell. Zooming in and out will be discussed in detail below.

Each cell can be color-coded or pattern-coded depending on performance results attained by a student, a class, a district, a state, or other grouping of performers on assessment items for the corresponding learning objective. The color-coding may indicate a level of performance of one or more students on one or more assessment items for a corresponding learning objective. For example, at the individual student level, green may be associated with mastery of the learning objective, yellow with "at risk" for not mastering the learning objective, and red with a failure to master the learning objective. In one example, if a student has obtained a performance score of greater than 85 percent, then the student may be considered as having mastered the learning objective. For example, if there are a certain number of points associated with assessment items that assess a given learning objective, and a student obtains 85 percent of the points by answering certain assessment items correctly, then the student may be classified as mastering the learning objective. If a particular student has obtained a performance score between 70 percent and 85 percent, the student may be at risk for not fully learning the objective. Lastly, if a student obtains a performance score of less than 70 percent, the student may be considered as failing to master the learning objective.

Similarly, for a given group of students, green may indicate that the group has met a mastery target; yellow may indicate that the group is approaching a mastery target; and red may indicate that the group is failing to approach the mastery target. Students may be grouped based on class, teacher, school, district, state, demographics, such as sex or race/ethnicity, program participation such as ELL or Individualized Education Program (IEP), intervention groups, or ad hoc groups created by a user (e.g., the basketball team).

A given group of students' performance level (for example, at mastery target, approaching mastery target, or failing mastery target) may be based on the percentage of students in the group who are deemed to have mastered each learning objective. For example, mastery of the learning objective at the student level may be defined as answering correctly at least two out of three questions within a particular standard. At the class level (or other grouping of students), level mastery may be defined in terms of the percentage of students who met this threshold. For example, a class might be deemed to have met a mastery target for an objective if 85% of the students in the class were classified as having mastered the objective. An alternative approach may base a given group of students' performance on the average points per student in the group. For instance, if a set of assessment items for the learning objective has an associated number of points that can be earned by answering the assessment items correctly, then average number of points earned per student can be determined, and the class's collective performance may be determined based on the percentage of total points to which the average corresponds (for example, if the average number of points is above 85 percent of the total points, the class may be classified as learning objective having met a performance target). In some implementations, performance can be described as pass or fail. Other calculations, percentage requirements, statistics, or rules can be used to make performance determinations by learning objective, which can then be depicted visually on the learning map.

In the example shown, the learning maps structures 210, 214, 216, and 218 are being displayed for a group of students (as opposed to a single student) and the colors of the cells correspond to the performance level of the group as a whole on the corresponding learning objectives. For example, the learning objective 6.N.14 represented by cell 222 is colored green to illustrate the class has reached the mastery target of this learning objective, the learning objective 6.N.1 represented by cell 206 is colored yellow to illustrate of the class is approaching the mastery target, the learning objective 6.N.16 represented by cell 208 is colored red to indicate the failure of the class to reach the mastery target for the learning objective. If there is no corresponding assessment data, or a performance level is not otherwise available for some reason for a given learning objective, then the corresponding cell may be colored gray or some other color.

The color-coding can be used to analyze performance results to quickly determine where issues may require further action with respect to particular students and/or curriculum. For example, the color-coding can provide visual feedback to a teacher who can determine whether he or she should plan to re-teach a learning objective to a small group of students, or an entire class.

Other navigational and configuring tools can be included in user interface 200. For example, a panning control 224 can be used to pan around a number of learning map structures. In a similar fashion, the user can pan around the learning map structures by selecting and dragging inside the learning map window. Other tactile or manual input mechanisms can be used to accomplish the same panning feature. For example, the learning map application may be presented on a touchscreen which can enable the user to use his or her touch input to modify a particular view.

The user interface 200 also includes a legend 225 (not fully shown) to ensure the user can properly read each learning map structure. The user interface 200 additionally includes the assessment toolbar 204 to enable the user to select the data for a particular learning map view. For example, in user interface 200, a user selected a specific school "Forest Green Middle School" from a dropdown control 226. In addition, the user selected grade "6," class "549," subject "Math," assessment "IA," period "3," and Student "All Students" from respective dropdown controls 228, 230, 232, 234, 236, and 238. In other examples, the user may select a different grade from dropdown control 228, a different class from dropdown control 230, or a different period from dropdown control 236. Other menu selections can be offered and selected.

The user may additionally select a different assessment from dropdown control 234. In this example, the user selected an assessment labeled "IA#3" which indicates an interim assessment for the third period of a school year for one particular course. In some implementations, the assessment may not be as specific. For example, assessments may be identified by a name or other descriptor to remove the assumption of how a district structures assessments. Examples of assessments can include, but are limited to, benchmark or interim assessments which may be given at fixed intervals to all students in a district who are taking the same course (e.g., 5th grade math or Algebra 1). Other assessments may be ad-hoc in nature and include teacher-created assessments, third party assessments, administrator-created assessments, among others.

In some implementations, the user may select a particular student or subset of students rather than "all students" from dropdown control 238. Upon selecting some or all information in the assessment toolbar 204, the user can select a done button 240 to commit the selections to a title banner 242. Upon committing the selections, the system 100 can update the banner 242 and update the display of the learning maps 210, 214, 216, and 218 to reflect the data corresponding to the new selection. In addition, a user can choose to minimize or shrink the assessment toolbar 204 by selecting a minimize control 244.

Figure 2B:
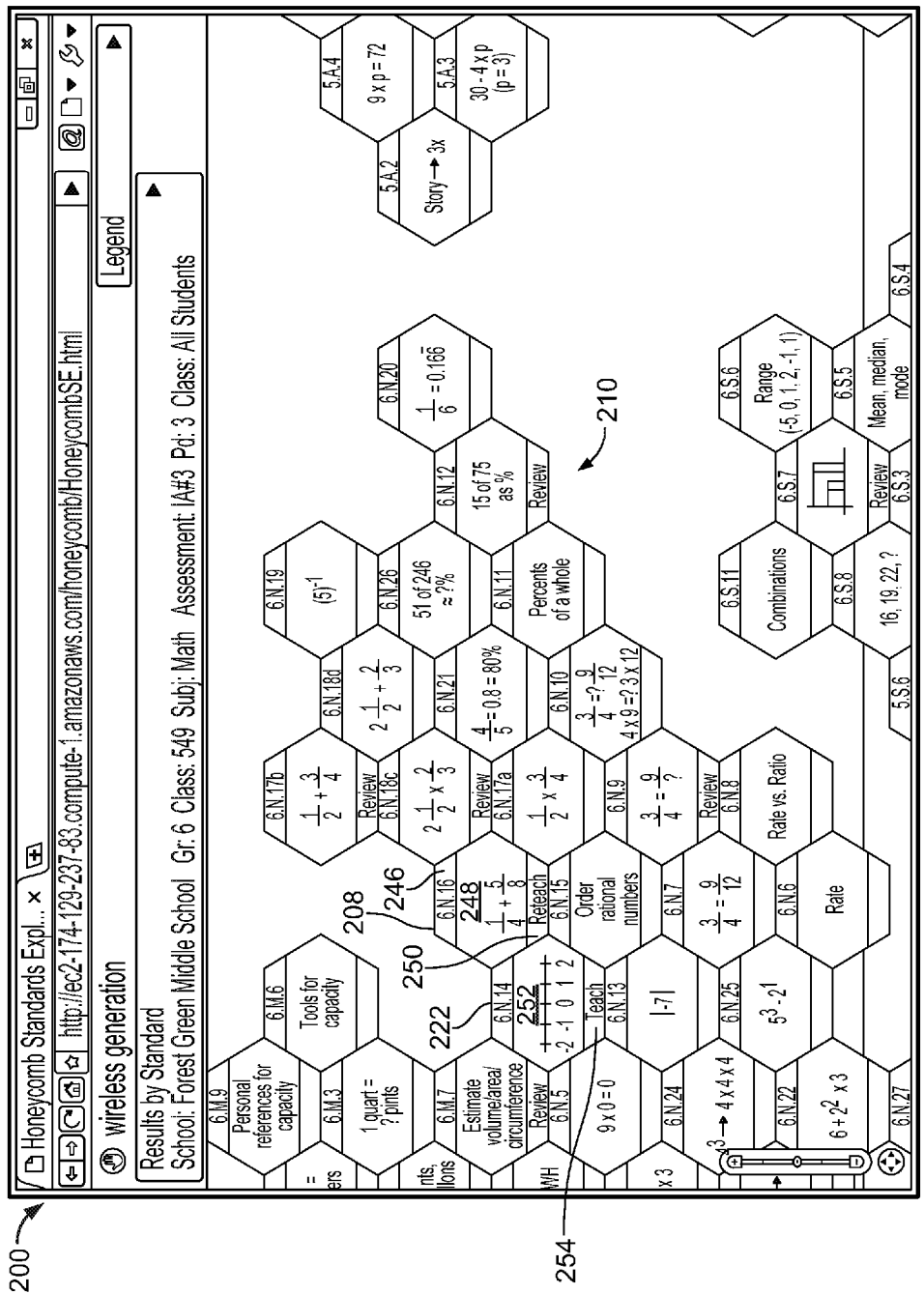

FIG. 2B illustrates a screenshot showing the user interface 200 zoomed into another level of detail. In this example, the user has selected the zoom control 220 (FIG. 2A) one or more times to zoom in on the learning map structures. The zoom action may apply to a single learning map structure, multiple learning map structures, or individual cells. The zoom action in this example zoomed all learning map structures to reveal further details in each cell. The zooming action can, for example, display the learning map 210 at a second level of detail, which shows a modification of the content of a cell. In particular, the zoom action provides additional indications of information related to the learning objective in addition to the (a) coded identifier indicating the learning objective (e.g., 6.N.16) and (b) the indication of the level of performance (e.g., red cell). For example, the learning objective (6.N.16) is now shown as three separate rows of data within the cell 208. A first row 246 includes the original coded identifier of the learning objective (e.g., 6.N.16). A second row 248 includes an icon, or other symbolic indication, or descriptive text of the corresponding learning objective to potentially convey the corresponding learning objective to the teacher more easily than the coded identifier. Namely, the second row 248 depicts a math problem involving two fractions with uncommon denominators (e.g., ¼+⅝), illustrating the addition of fractions of uncommon denominators, which corresponds to the learning objective 6.N.16. A third row 250 depicts a plan for the learning objective in the future. In particular, the third row 250 includes a teacher's plan to "Re-teach" the material in the learning objective (6.N.16) to the whole class. The teacher's plan typically includes instructions regarding a particular learning objective. The teacher's plan may be automatically dictated by student scores or selected by a teacher or administrator. The plan here may be to re-teach the material because the red color of the cell indicates that a desired number of students did not attain mastery of the learning objective (6.N.16). Planning functionality will be discussed in detail below.

As another example, the cell 222 holding the learning objective (6.N.14) includes a middle row 252 with a graphical representation of the corresponding learning objective. Here, the graphic is an integer number line indicating that a student should be able to locate rational numbers on a number line. Other shapes, icons, text, or symbols can be combined on cells.

In some implementations, the bottom rows of the cells can be individually color-coded to indicate something visually to a teacher. For example, the bottom rows may be color coded in a way that corresponds to the particular teaching plan associated with the learning objective.

Figure 2C:
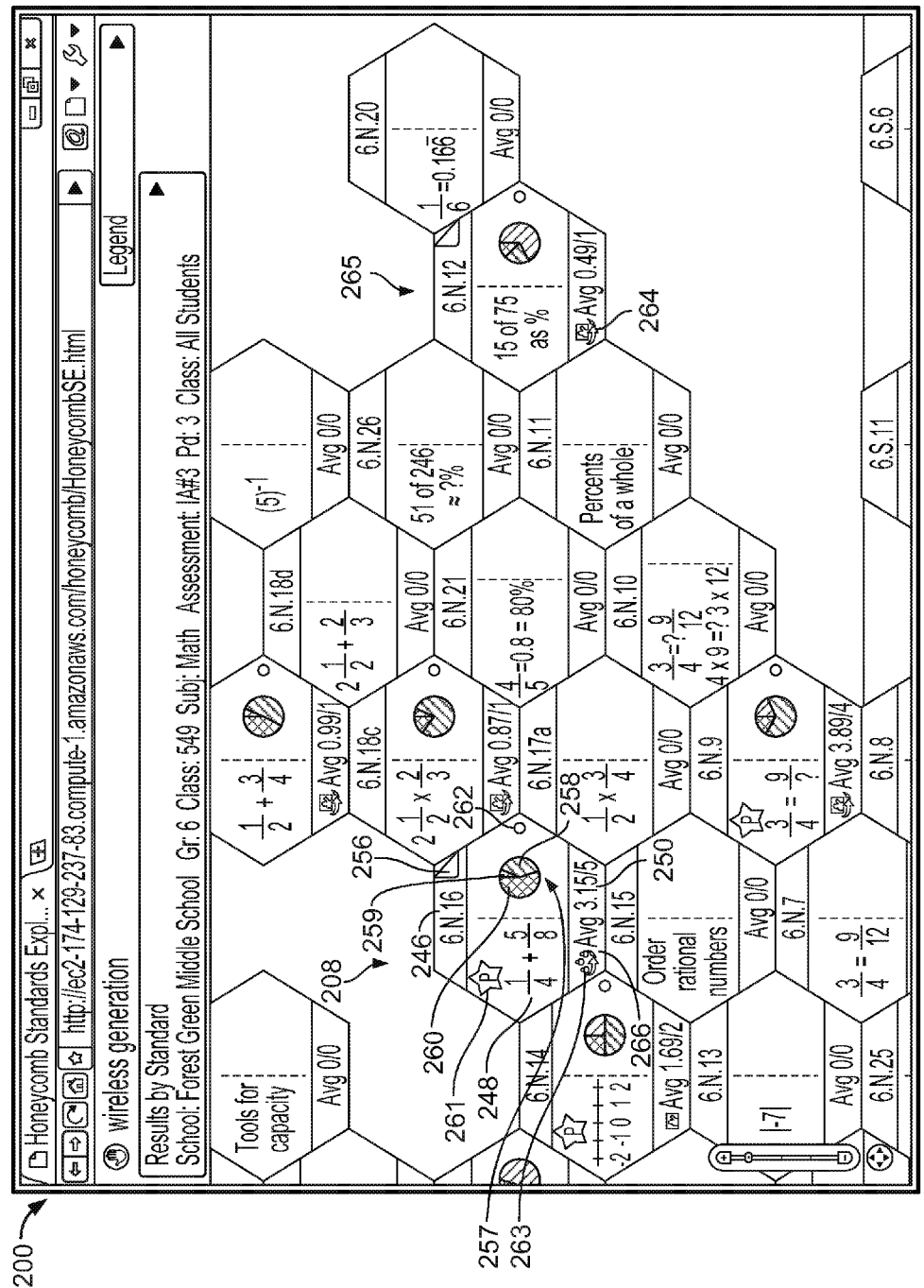

FIG. 2C illustrates a screenshot showing the user interface 200 zoomed into another level of detail. At this level of detail, the icons may include features that indicate whether an entire group of students is at risk of not knowing a learning objective, and what the relative split is among students in the group. In particular, the features may allow a teacher to quickly determine the class breakdown in terms of how many students have mastered the learning objective.

As shown, the cell 208 now includes the same three rows 246, 248, and 250 with additional data and/or functionality. For example, row 246 includes the original coded identifier (e.g., 6.N.16) with an added note symbol 256. The note symbol 256 may indicate that further details or notes associated with the cell 208 are currently available for viewing. To view the additional details, a user may select the note symbol 256. Upon selecting the note symbol 256, additional details can be displayed to the user in a pop-up dialog, an overlay, a note, a comment, a web page, or other presenting mechanism. Examples of notes and additional detail presentations will be discussed below in FIGS. 2F-2K.

The cell 208 also includes an update to row 248. The update shows the row 248 now semi-divided into two sections with the original math problem symbol on the left hand side of the divider and a pie chart 257 on the right hand side of the divider. The pie chart 257 represents the spread of performance results amongst students testing on the learning objectives (6.N.16) represented by the cell 208. Thus, the overall color (e.g., red) of the row 248 of cell 208 may illustrate the performance of the entire group, while the pie chart 257 concurrently indicates a proportion of students (i) at risk (ii) at mastery, or (iii) at non-mastery. That is, the color of the row 248 may indicate a level of performance for the entire group, as described above, while a corresponding pie chart or other graphic may indicate a proportion of multiple students at one or more levels of performance.

In the example shown, the pie chart 257 depicts three color-coded portions: (a) a proportion 258 of students who have mastered the corresponding learning objective (e.g., color-coded green), (b) a proportion 259 of students who are at risk for not knowing the corresponding learning objective (e.g., color-coded yellow), and (c) a proportion 260 of students who have yet to master the corresponding learning objective (e.g., color-coded red). Furthermore, the pie chart 257 indicates that a large percentage of the class have yet to master the learning objective represented by cell 208 (i.e., the largest pie piece is red), and as such, row 248 of the cell 208 is color-coded red to indicate this statistic. Thus, the row 248 provides the advantage of presenting both how well the class is doing together with a percentage pie chart showing how many students are doing well versus not well on the learning objective. The concurrent display of an indication of the group-oriented performance level of the group of students and an indication of the proportion of the students in the group at the multiple student-oriented performance levels can eliminate a misunderstanding of whether the issue is a large portion of a class or with just a select few students. This particular visualization may provide an easy mechanism with which to decipher class versus individual performance at a quick glance.

The row 248 additionally includes a power objective icon 261. The power objective icon 261 may indicate that the learning objective (6.N.16) represented by cell 208 is a power objective. Power objectives represent a subset of learning objectives at each grade level that are the most important for students to master. Power objectives may represent a minimum foundation without which students may have great difficulty mastering later objectives. In some examples, power objectives represent a "safety net" of objectives each student should learn prior to leaving a particular grade level. The power objectives can be used to ensure that students who acquire this "safety net" of understanding, knowledge, and skills exit one grade better prepared for the next grade. The power objective icon 261 can ensure a teacher understands at a glance which objectives are required to move a student or class to the next level. The teacher can then, for example, use this information for planning purposes.

The row 248 also includes a cell flip control 262. The cell flip control 262 can be employed to flip or "turn over" a cell. In one example, the flip of a cell may be graphically shown as a 180 degree turn around a vertical axis. In the depicted example, a user can select the cell flip control 262 to reveal more information about a particular class. In some implementations, selecting the flip control provides information (e.g., questions and answers) that caused particular cells to be color-coded in a specific manner.

The cell 208 includes the row 250. The row 250 includes a teaching plan icon 263 which indicates a selected teaching plan for the learning objective, which, in this case, is "class re-teach" (described below). As another example, the teaching plan icon 264 shown in cell 265 indicates a "review" teaching plan (as described below).

The row 250 also includes an average indicator 266 which indicates an average number of points earned per student for a learning objective, and the total number of points. The average indicator 266 shows an average score of 3.15 points out of 5 points. The average in this example is average over 5 points because the assessment items for the learning objective (6.N.16) represented by cell 208 had a corresponding total of 5 points. In some cases, the total number of questions may equal the total number of points achievable for a particular learning objective, while in other cases there may be more or less questions than the total number of points (for instance, if one question is worth more than a point or worth only a fraction of a point).

Figure 2D:
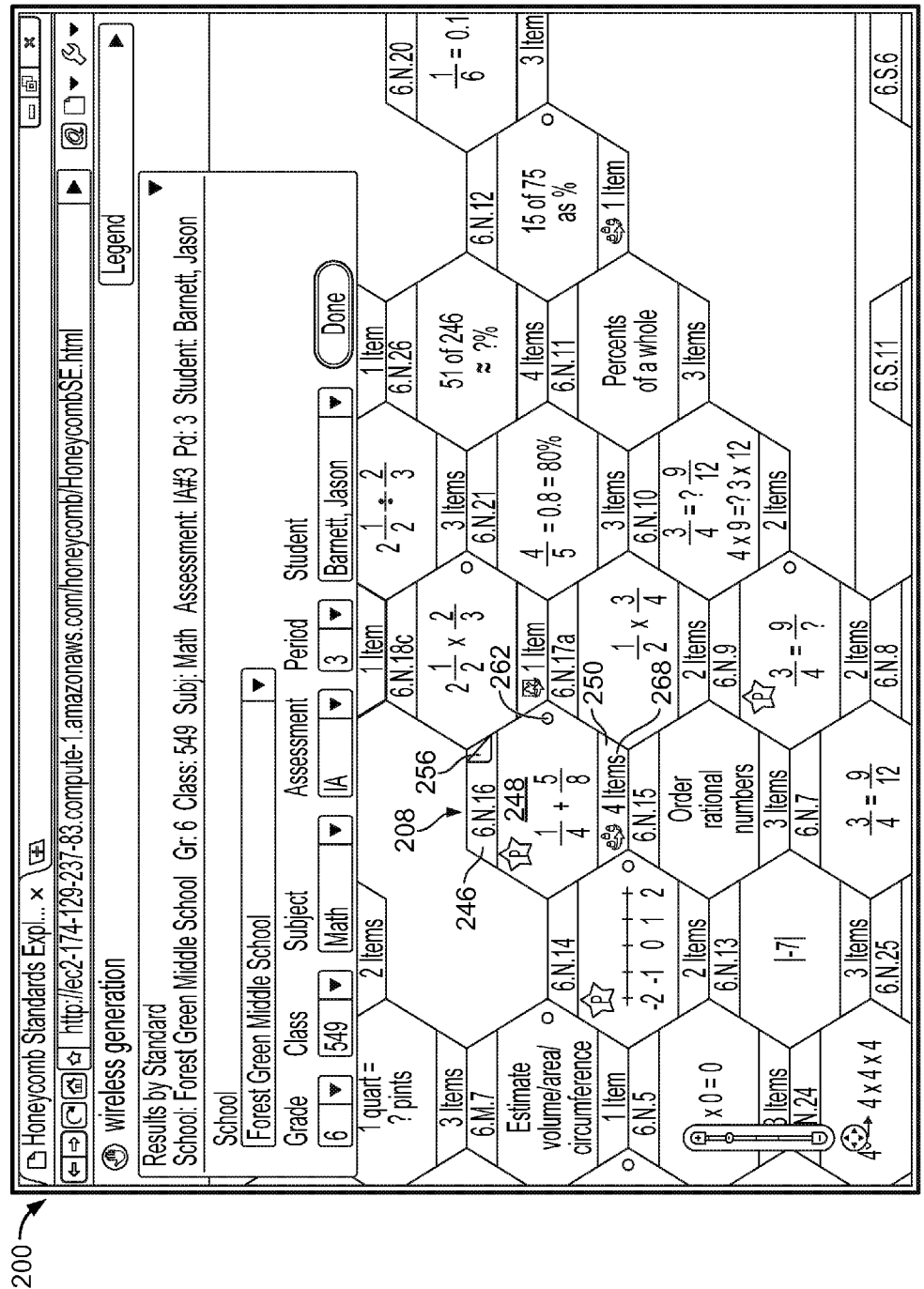

FIG. 2D illustrates a screenshot showing the user interface 200 where a user has changed a selection in the student dropdown control 238. As shown, the user selected one particular student "Jason Barnett" instead of the "All Students" selection described above. The cells shown in FIG. 2D pertain to the student "Jason Barnett." The cell 208 includes rows 246, 248, and 250 as shown in FIG. 2C. The information depicted is similar to the previous screens (learning objective, performance level, teaching plan), with the exception of row 250, and the interface can provide the same zooming functionality to provide different levels of detail when a single student is displayed instead of a group. The row 250 includes text 268 stating "4 items." The items pertain to four assessment items (e.g., questions) used to assess a student against the learning objective. Similar functionality exists for selecting the note symbol 256 and selecting the cell flip control 262.

At some point, a user can select the cell flip control 262 to reveal information about the performance of the student "Jason Barnett" corresponding to the learning objective associated with the cell 208.

Figure 2E:
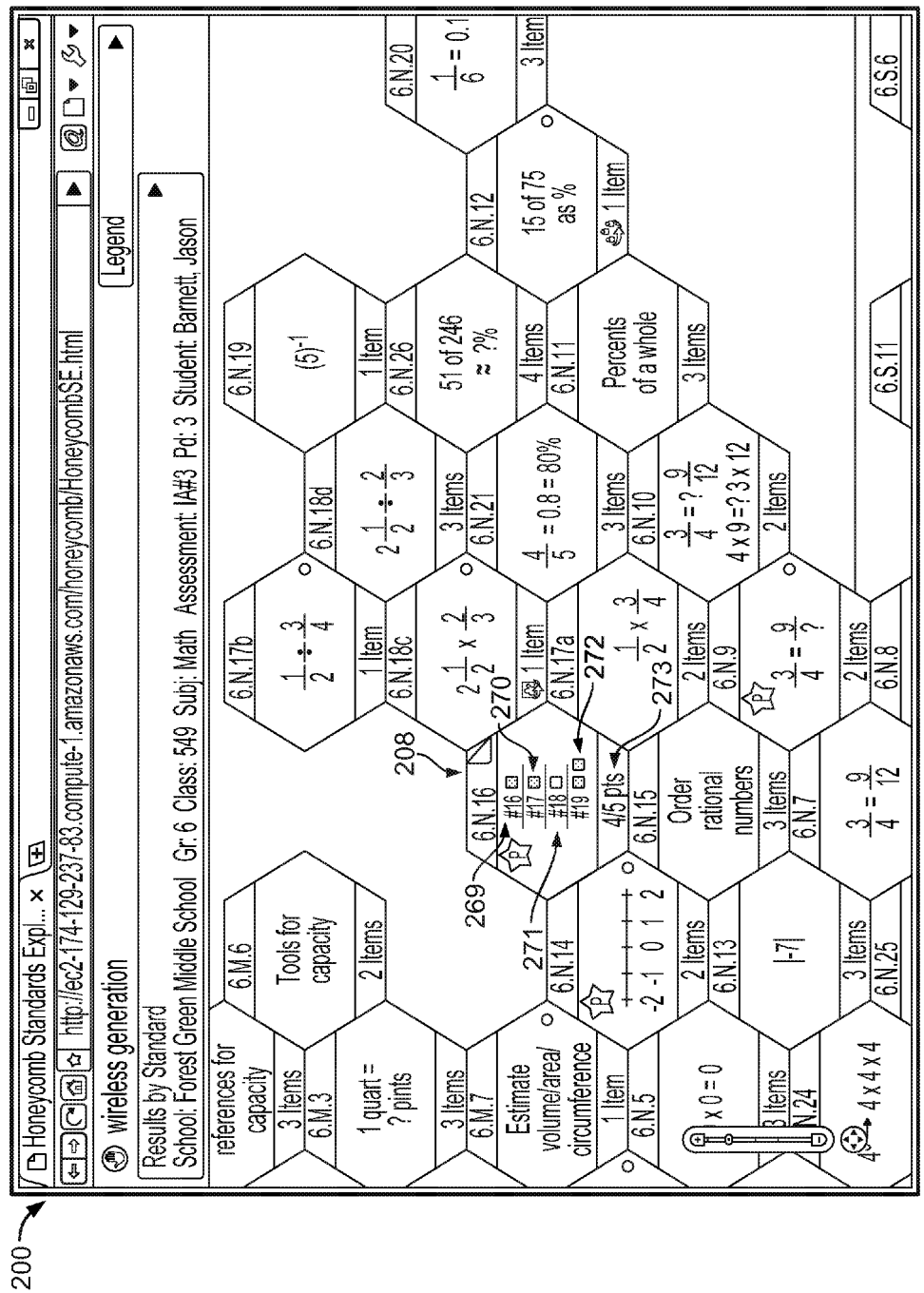

FIG. 2E illustrates a screenshot showing the cell 208 after activating icon flip control 262. The cell 208 here shows four numbered items 269 (#16), 270 (#17), 271 (#18), and 272 (#19). Each numbered item 269-272 may correspond to an assessment item (e.g., question) that was used to test Jason Barnett's ability in relation to the learning objective (6.N.16).

A number of symbols are shown near each numbered item 269-272. The symbols may depict whether the student obtained the points associated with the assessment items 269-272, for example, by answering the assessment item correctly. For example, a shaded symbol, as shown near numbered item 269 and 270, may indicate that Jason Barnett received the points associated with the two items, for instance, by answering them correctly. Similarly, a non-shaded symbol, as shown near numbered item 271, may indicate that Jason Barnett inaccurately answered the question corresponding to numbered item 271 and therefore did not obtain the corresponding points. In some implementations, multiple points may be associated with a single numbered item. For example, numbered item 272 includes two shaded symbols indicating that two points may have corresponded to numbered item 272. Here, Jason Barnett accurately answered the assessment item in such a way that he received both points. A summary of Jason Barnett's assessment is shown by text 273. The text 273 depicts a score of 4 out of 5 points which corresponds to 4 shaded symbols and 1 non-shaded symbol in the cell 208.

Figure 2F:
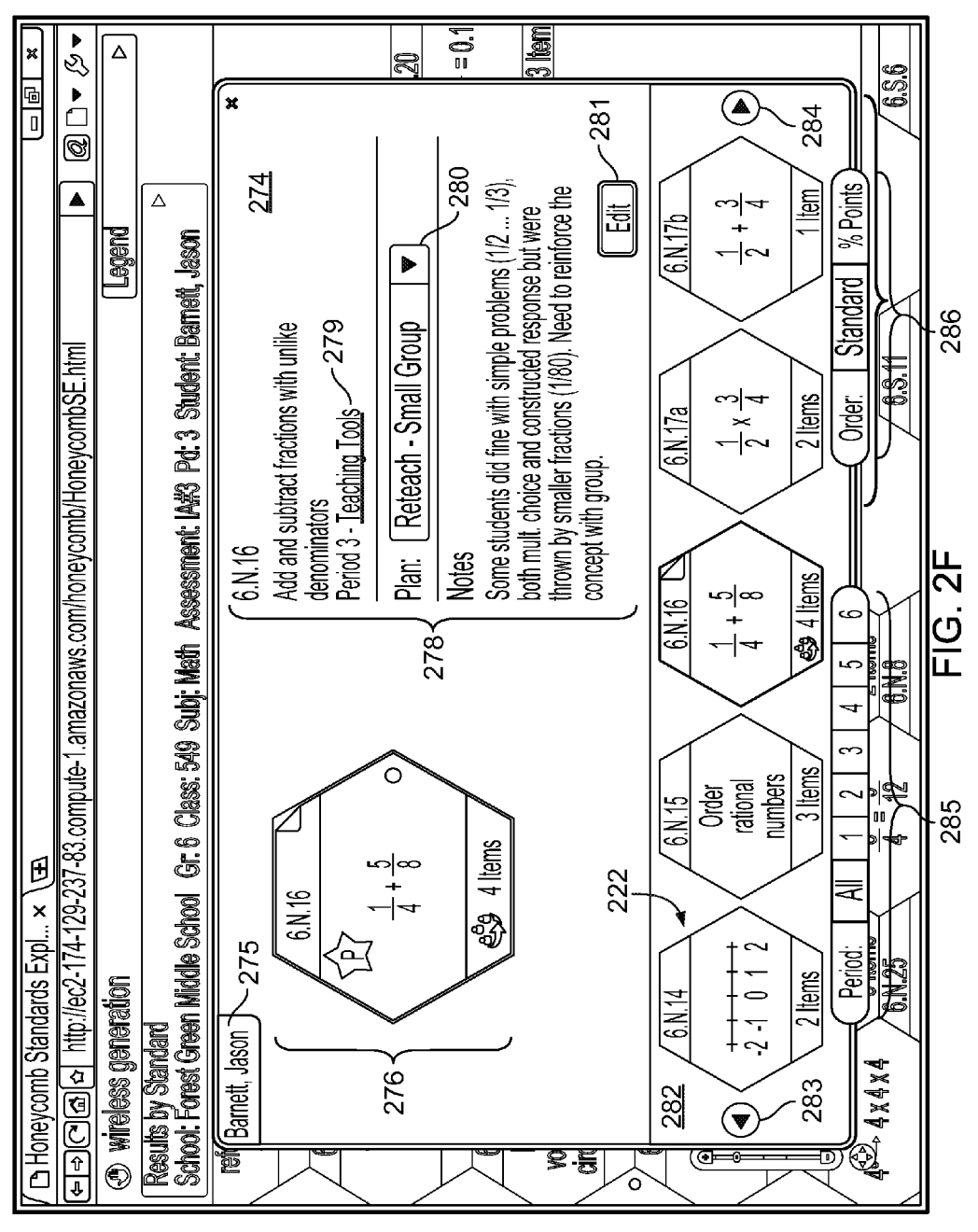
Figure 2G:
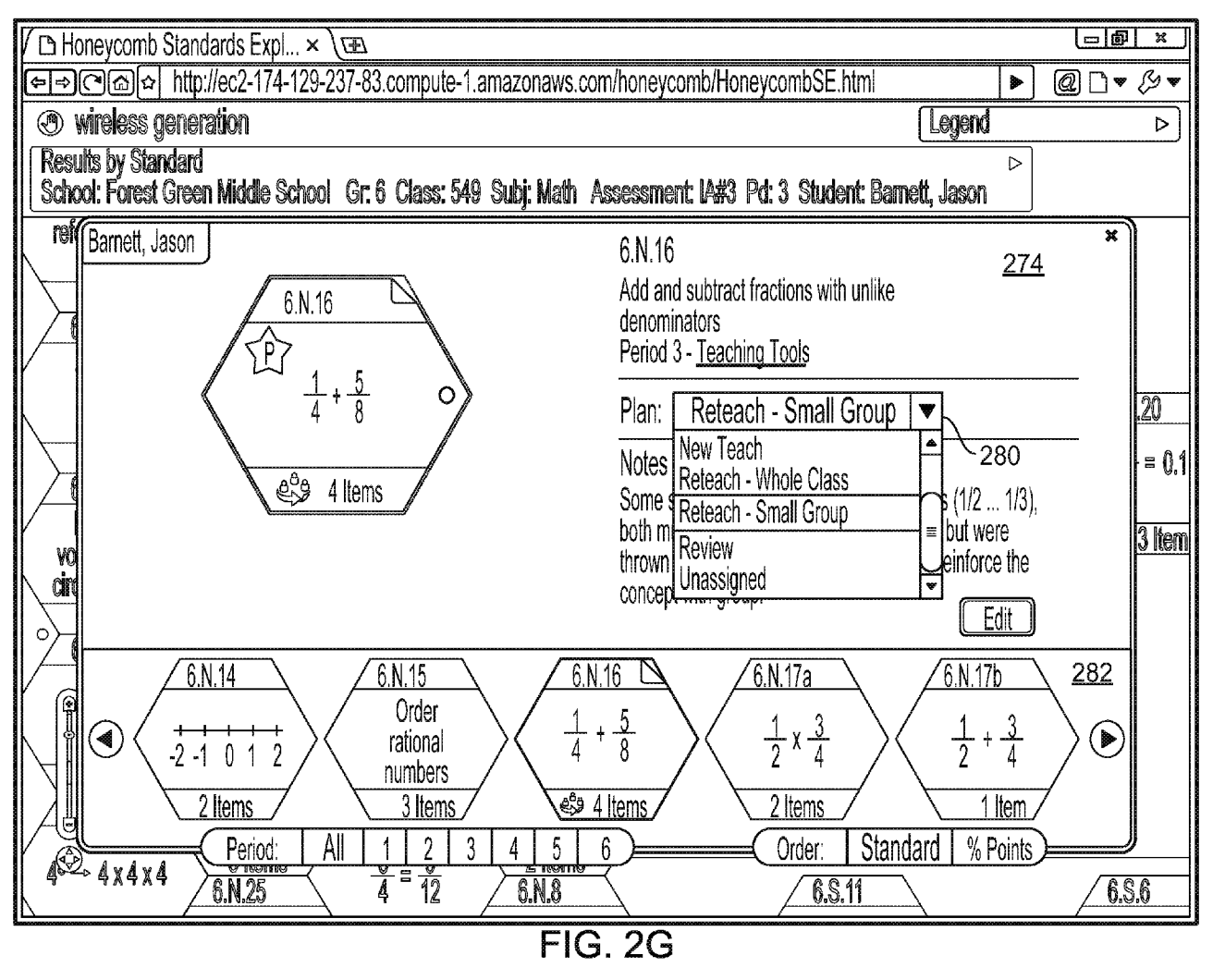
Figure 2H:
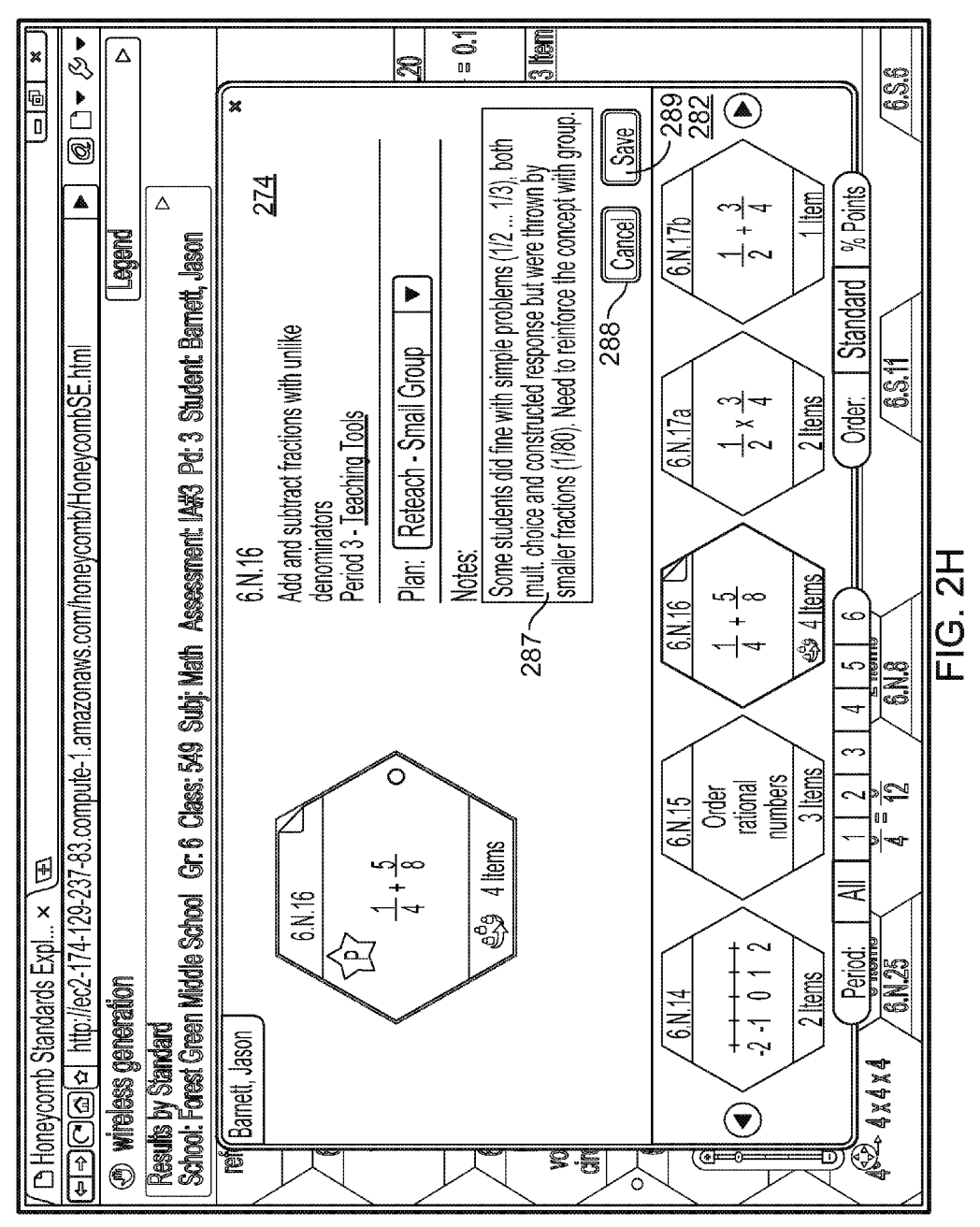

FIGS. 2F-2H illustrate example screenshots showing an overlay 274 related to cell 208. The overlay 274 can be navigated to by selecting the cell 208 shown in FIG. 2D, for instance, by clicking a mouse over the icon 208. The overlay 274 illustrates details about the student "Jason Barnett," as indicated by tab 275. The overlay 274, or similar overlay, may similarly be provided when the icon 208 in FIG. 2C (relevant to all students) is selected. Such an overlay may provide the same, or similar, functionality with respect to the group of students as overlay 274.

Referring now to FIG. 2F, the overlay 274 includes a graphic 276 of the cell 208. The graphic 276 represents the state of the cell 208 before a user selected the cell. The overlay 274 includes an interactive detail area 278 that can be accessed by teachers or other staff. The detail area 278 can include a variety of details. For example, the detail area 278 includes the text of the standard description (e.g., "6.N.16—Add and subtract fractions with unlike denominators"). Other descriptive details can be included in reference to the standard or associated learning objectives. For example, a period notation may indicate the period for which data is being displayed.

The detail area 278 may also include one or more resource links 279. The resource links 279 may be links to teaching resources related to the corresponding learning objective, such as teaching tools, teaching materials, ideas, curriculum content, lesson plans, videos, or other content specific to the learning objective corresponding to the selected cell (in this example, for standard 6.N.16). In general, the materials may assist teachers in developing lesson plans for the learning objective, as well as addressing student issues with actually learning the objective. In some implementations, the resource links 279 may be placed directly on a cell, rather than in an overlay. The resource links 279 are configured to cause, when selected, a display of the teaching resources related to the learning objective. For instance, in one implementation, when the user (for example, a teacher) selects the resource link 279, a web page containing the materials is retrieved and displayed.

The resource links 279, and underlying resources, may be intelligently filtered or ordered. For example, the various resources may be reviewed and rated by other teachers (or other users) and those resources above a certain rating may be selected to include on the overlay or cell, or the various resources may be included on the overlay or cell in an ordered list, ordered based on the ratings. Other factors may be used to select the resources to link to, or to order the resource links. For example, if the teacher is part of a social network, for instance, implemented by system 100, then the fact that a member of the viewing teacher's social network has used or rated a particular resource may be used when filtering or ordering the resource link.

The resources and associated links may be filtered based on geography and/or the instructional materials used by the school and/or school district. For example, if the teacher is located in a particular state, then the linked resources may be those relevant to the standards of that state, or relevant to particular teaching methods approved in that state. Similarly, if a particular set of instructional materials are employed by a school or district to teach the subject matter reflected by the learning map, then the resources may be those that supplement those instructional materials.

The resources may be provided by third party providers 108. In general, system 100 may provide a platform for the third party providers to deliver the resources to the relevant recipients. For example, the system 100 may provide a mechanism for the third party to designate the third party's resources, and indicate what types of learning objectives to which the resources are relevant, as well as other information about the relevance of the resources such as particular geography or instructional materials. The system 100 then may select the resources as appropriate based on this information, as described above. Furthermore, the third party providers 108 may want to charge the teacher, school, or school district for access to some or all of the resources provided by the third party. The system 100 may provide a mechanism that allows the teacher, school, or district to purchase access to the third party's resources.

In such a scenario, certain free resources provided by a given third party may be linked to by resource links so that a teacher or administrator can access the resource while looking at a learning map and evaluate the usefulness of the resources provided by the third party. The user interface (or another interface) may provide the teacher or administrator with a mechanism for then purchasing full access to the third party's library of resources, which will then be linked to by the learning map.

Other filtering tasks and/or ordering of links can be performed. Depending upon how much metadata is available for particular resources, and how much student data is available, there are various tasks that can be performed. For example, the system may inspect the student data to find students who are struggling with a particular learning objective, and see if they are ELL students (English Language Learners, i.e., students whose native language is not English). If the system determines the students are indeed ELLs, then the system could suggest resources that have been written with that particular population in mind, or otherwise validated as appropriate for the needs of that population. In some implementations, the system may inspect student data to determine a learning disability, for example. Similarly, depending on the number of students who need remediation, the system could suggest resources that are appropriate for large group (e.g., whole class), small group, or one-on-one instructional settings, whichever is most pertinent to the situation. These general concepts could be applied to both teacher-delivered instructional resources (e.g., lesson plans, activities, etc.) and computer-delivered instructional resources (e.g., computer-tutorials). For example, if a particular student's native languages are available to the system, then the system could locate and recommend computer-based instructional activities that are in that language. If there are designated funds that are allocated to particular students (e.g., Title I or IDEA funds), then the system could take that into account in recommending effective ways to spend that money (e.g., specialized computer-based instruction for students with particular learning disabilities). In some implementations, a district could put in place a contract in which the use of various vendors' instructional resources is pre-authorized, but where the vendor is only paid when teachers actually select those resources to download and use, and where the amount of the payment is dependent upon the amount of use.

The detail area 278 includes a teaching plan selector 280 that may be configured to receive an indication of a teaching plan for the learning objective corresponding to the cell. The teaching plan then may be stored in association with the cell.

In general, the plan selector 280 provides a tool for teachers to select a teaching plan for one or more individual learning objectives, normally based on a group's or individual student's performance with respect to the learning objective. The plan selector may include predefined types of teaching plans that can be selected by the teacher. In some implementations, the lesson plan may include corresponding visual representation (not shown). The plan selector 280 is described further with respect to FIG. 2G.

The detail area 278 includes a note area 281. The note area 281 can be used by a teacher to add one or more notes regarding the selected teaching plan and/or previous teaching activities. The note area 281, for example, may allow a teacher to capture information that provides more detail about the predefined teaching plan selected by the teacher. Notes can be edited or appended to by selecting an edit control 281. In some implementations, the note area 281 can be used to keep notes on a particular student or class. The notes can be accessed by teachers or other users from another view outside of the overlay 274. For example, if a note has been entered in a particular overlay, the corresponding cell will include a note symbol, such as note symbol 256 (FIG. 2D).

The overlay 274 includes a scroll area 282. The scroll area 282 provides a mechanism to scroll through and view other cells from a related learning map. For example, the cell 222 introduced in FIG. 2A is shown in scroll area 282. The cell 222 can be selected by a user. The selection can cause the cell 222 to be displayed in place of the cell 276. Furthermore, upon selection of cell 222, details in the detail area 278 may be updated to reflect details about the cell 222. Other cells can be selected. In addition, the scroll area 282 can be scrolled left using a control 283 or right using control 284 to present more selectable cell options.

The overlay 274 includes a period selector 285 and an order selector 286. The period selector 285 provides a mechanism for selecting one or more assessments. The period selector 285 may be based on the assumption of a fixed sequence of interim or benchmark assessments, such that "assessment 3" was a meaningful term. In some implementations, the system may ask users to choose an assessment from a list, rather than assuming that a single-digit integer can be used to meaningfully identify a particular assessment.

The order selector 286 may determine the order in which the system would display the learning objectives, if a user were browsing through them. Here, for example, the user has selected (6.N.16). However, the user may wish to review objectives one by one in a linear fashion. In this example, the user can review objectives by selecting options such as before and after in the order selector 286. The order selector 286 may define what "before" and "after" implies according to the objectives. In this example, if a user selects a "Standard" option, then the objectives appear in their native order (e.g., the predecessors would be 6.N.14 and 6.N.15, while the successors would be 6.N.17 and 6.N.18). If the user selects a "% points" option, then the objectives would be sorted based on how a class performed (e.g., the predecessors would be the two objectives on which the class scored the next worst after the selected objective, while the successors would be the two objectives on which the class scored the next best after the selected objective). Other sort orders are also possible. For example, the objects may be ordered based on how the objectives are laid out on the learning map.

Referring now to FIG. 2G, the overlay 274 is shown with the plan selector 280 showing options for a teacher to select a teaching plan. The plan selector can provide selectable options for predefined teaching plans including, for example, "Future", "New Teach", "Re-teach-Whole Class", "Re-teach-Small Group", "Review", and "Unassigned." The "Future" plan may be selected to set a plan to teach a particular standard in the future. The "Future" plan can be selected based on what standards should be taught based on preset scope and sequence calendar in one or more periods following the next period. A "scope and sequence" may be a division of a set of learning objectives into subsets each of which corresponds to a benchmark assessment. For example, if there are 5 benchmark assessments over the course of a school year, then the learning objectives that are supposed to be covered or introduced during the period before benchmark #1 constitute the scope for period 1, those that are supposed to be covered or introduced during the period between benchmark #1 and benchmark #2 constitute the scope for period 2, and so forth. The "sequence" generally refers to the ordering within the objectives for any given period. This may represent a logical way of thinking about and structuring the objectives that need to be covered over the course of a given course, although some school systems may not follow this sort of approach (although some do). Accordingly, in some implementations a more flexible approach may be employed.

The "New Teach" plan may be selected to designate what standards should be taught in the next period based on a preset scope and sequence calendar. The "Re-teach-Whole Class" plan can be selected if a teacher wishes to re-administer instruction based on some portion of the class not reaching a certain level of achievement on a learning objective. The criteria for when to select a re-teaching plan may be set or preset by a school district, school, or teacher. The "Re-teach-Small Group" plan can be selected if a teacher wishes to re-administer instruction to a subset of students that fall below a pre-determined percentage of the class, for example. The "Review" plan can be selected if a teacher wishes to re-teach a topic even if all the students have successfully mastered a particular learning objective. For instance, the teacher may select the "Review" plan if a particular learning objective is a "power objective." The re-teaching process can ensure the "power standard" learning objective is solid before moving on to other topics and/or learning objectives. The "Unassigned" plan may be assigned by default until another entity modifies the plan.

In the example shown in FIG. 2G, the user selected a "Re-teach-Small Group" plan, as indicated by the highlighted selection. The user can select a plan for the objective (6.N.16) and choose to exit the overlay 274, enter notes pertaining to standard (6.N.16), or select another one or more cells from scroll area 282 for configuration. In some implementations, an initial plan may be chosen for a given cell based on the assessment data, but a user can then select another plan, for example, after reviewing the specific assessment items and/or the student answers to those items.

Referring now to FIG. 2H, the overlay 274 is shown with the "Re-teach-Small Group" plan selected. The user may choose to enter a note pertaining to the student's performance, the class's performance, a combination of both, and/ or notes about how to implement the plan. The user can select the edit control 281 (FIG. 2G) to enter a note 287. The note 287 indicates that "Some students did fine with simple problems (½. . . ⅓), both multiple choice and constructed response but were thrown by smaller fractions (1/80). Need to reinforce the concept with group." The note 287 explains what will be re-taught and why. The user can choose to cancel the note 287 by selecting a cancel control 288. The user can alternatively choose to save the note 287 by selecting a save control 289. The user can add or alter notes from other cells by selecting one from the scroll area 282.

Referring now to FIG. 2I, an overlay 290 is depicted. The overlay 290 can be presented if, for example, a user selects on the cell 208 (FIG. 2E) when in a flipped state (e.g., the user selected flip control 262 (FIG. 2D)). As with overlay 274, overlay 290, or similar overlay, may similarly be provided when the icon 208 in FIG. 2C (relevant to all students) is selected. Such an overlay may provide the same, or similar, functionality with respect to the group of students as overlay 290.

Here, the flipped cell 208 is shown as an interactive graphic 291. The overlay 290 includes an interactive detail area 292. The detail area 292 includes the text of the objective description (e.g., "6.N.16—Add and subtract fractions with unlike denominators"). Other descriptive details can be included in reference to the associated learning objectives. For example, a period notation associated with the period may be included, as well as the resource links, as described above.

The detail area 292 includes a statistics section 293. The statistics section 293 includes graphics that illustrate the proportion of students at each student-oriented performance level on a class, a school, or a region basis. In the example shown, the statistics section 293 provides pie chart graphs, like pie chart 257, to depict a proportion of students (i) at risk (ii) at mastery, or (iii) at non-mastery at each of the class, school, and region group levels. The pie chart 257 is exemplary and as such, different statistics can also be detailed using a similar graphic or additional graphics. In some implementations, the pie charts can show data in each period such as IA1, IA2, and IA3.

Figure 2J:
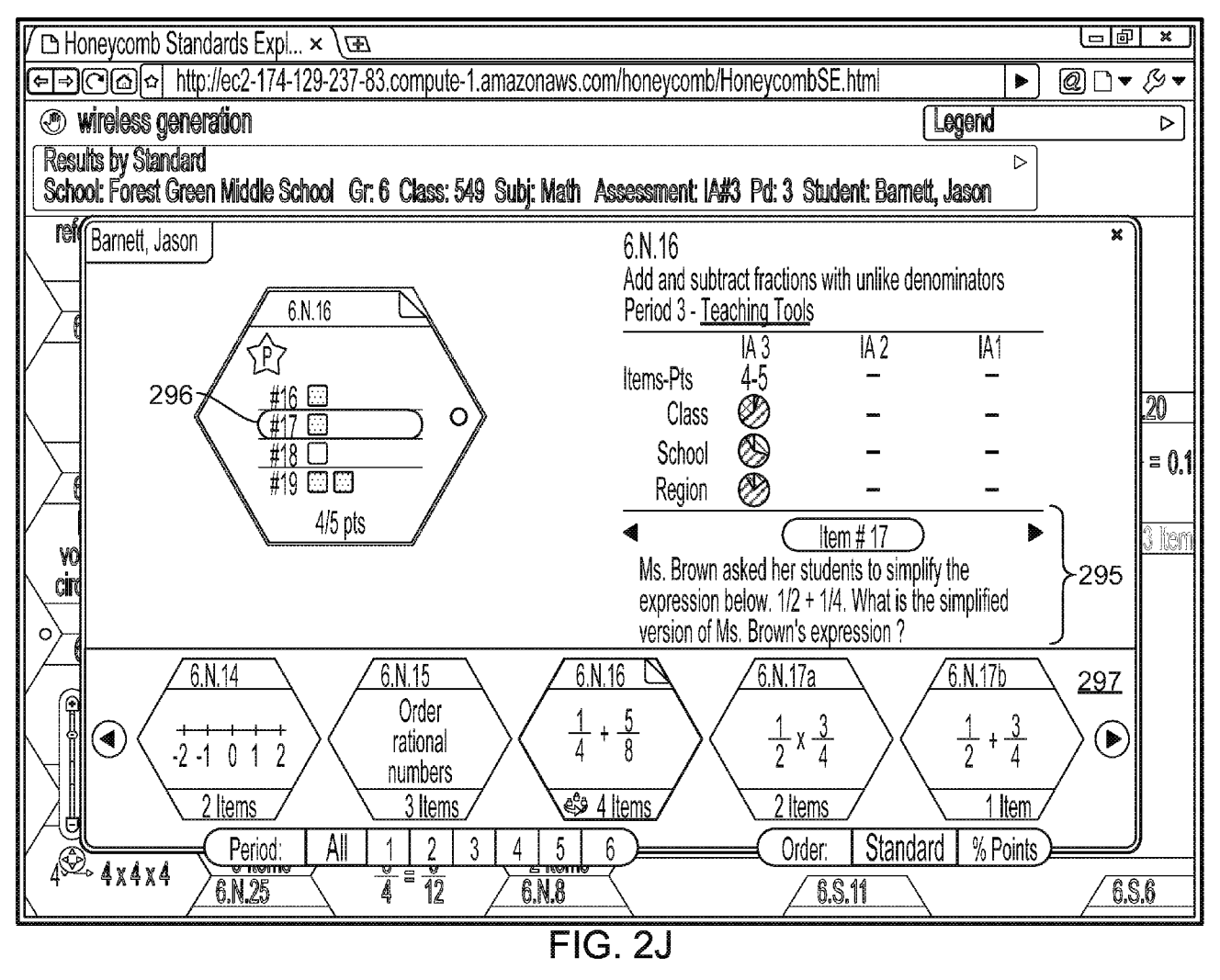

At some point, a user can make a selection on the interactive graphic 291. As shown, the user has selected item (#16) 294. In response to selecting item 294, the question (i.e., assessment item) corresponding to item 294 is displayed in a control 295. Referring now to FIG. 2J, the user selected item (#17) 296 and the control 295 updated accordingly. In general, the user can select each item identified by number (#16-19) in the cell on the left and the text of that item (e.g., questions) are shown at the right in the control 295. Alternatively, the user can use control 295 to scroll through each item or question listed on the graphic 291. Similar to the previous overlay 274, the overlay 290 also includes a scroll area 297 which can be used to select other cells.

Figure 2K:
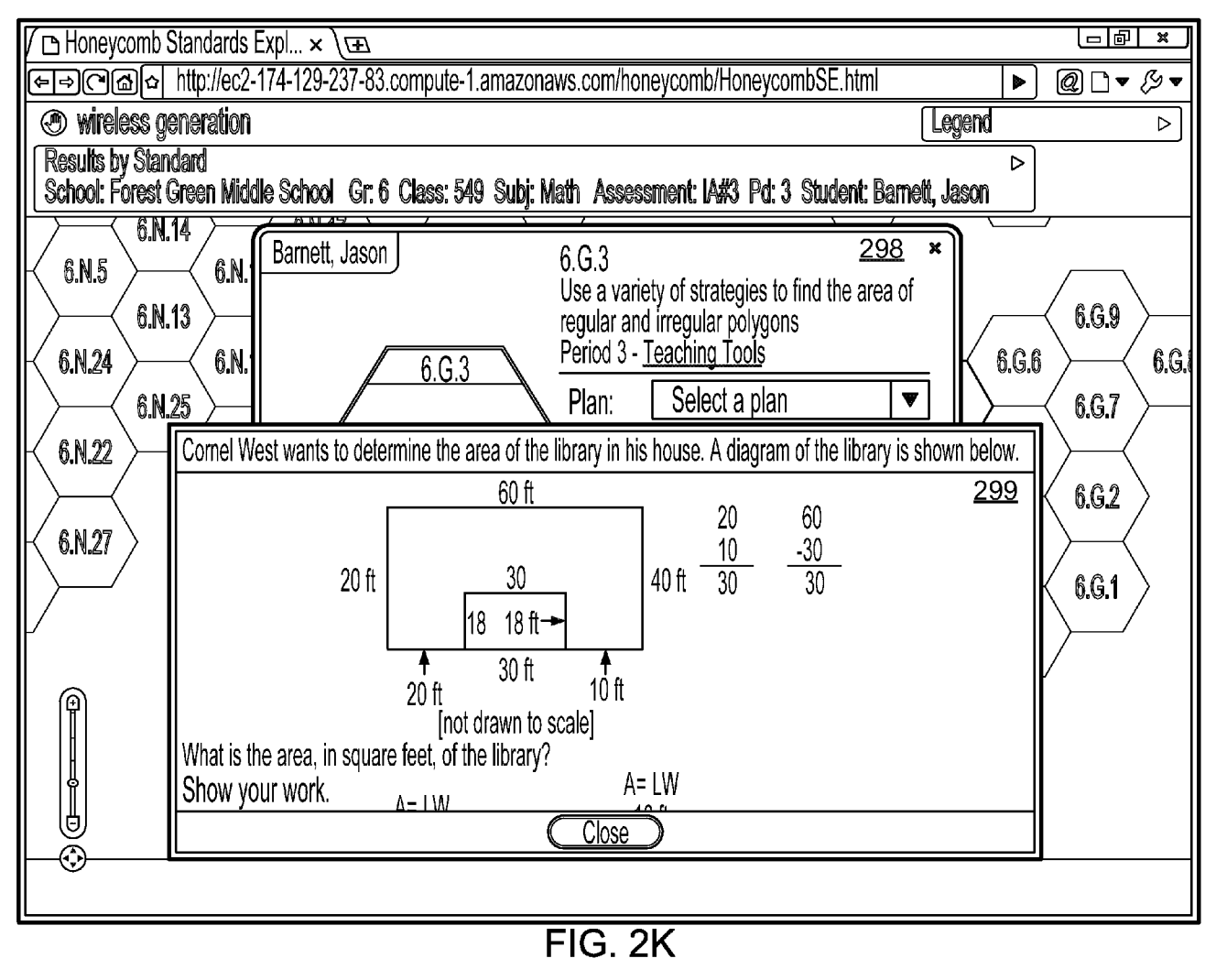

Referring now to FIG. 2K, an overlay 298 is depicted. This example pertains to a "constructed response" (i.e., an open response) item. The "constructed response" item may mean that a student has been asked to produce a written response to a question or prompt. The overlay 298 pertains to a different standard (6.G.3) for the student "Jason Barnett." Here, the user has selected an option on overlay 290 to view the student's actual work product. This may be a scanned image of the student's pencil-and-paper based administration, or typed text for computer-based administration, for example. This may also include audio or video of a student performing a task. While not shown in FIGS. 2I and 2J, the overlay 290 can include a link to the student's work product associated with control 295. Selecting the link presents the student's work as another overlay 299. The overlay 299 can be analyzed by a teacher or other entity. This can provide the advantage of having each test question and answer or work product on hand when reviewing student results. Thus, the user may not be required to find a copy of the test.

In some implementations, a student's "selected constructed response" may be provided. The "selected constructed response" may represent a multiple choice item. With the multiple choice item, a list of answers can be provided including a correct answer and several incorrect answers (e.g., distractors). In some implementations, a list of students can be provided detailing which student made each choice and a description of a particular misconception that may have led a particular student to choose an incorrect answer.

Also, while the examples show a display of the student's response (answer to the assessment item) and the student's work product, other implementations may display the student's responses to one or more of the assessment items with or without showing the work product. For instance, for multiple choice assessment, the display may show only the item selected by the student, without showing the work the student performed to arrive at the selection (although other implementations may show both).

The plurality of screenshots described above can be adjusted to provide various mechanisms for collecting and displaying data regarding a group or individual. The information collected and/or displayed can be individual-oriented when an individual is selected and group-oriented when a group is selected. For example, while some of the information displayed in overlay 274 is depicted as being group-oriented even though an individual is selected, in other implementations the information (for example, the plan and notes) may be individual-oriented. The information collected and/or displayed can also be a combination of both individual-oriented and group-oriented information regardless of whether an individual or group is selected. Moreover, any combination of group and individual data can be depicted in the same application or screen regardless of the actual application or screen invoked.

Figure 3A:
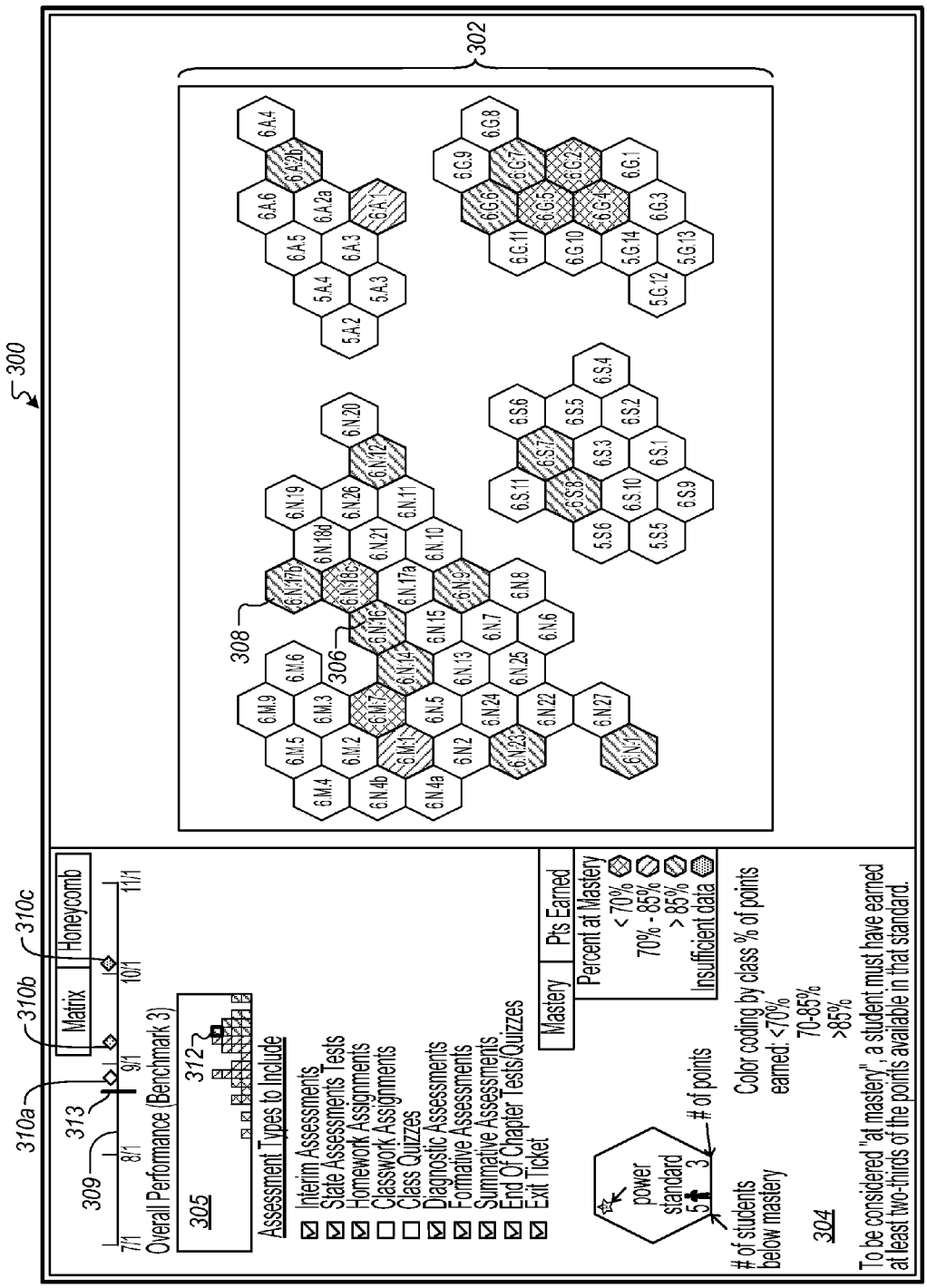

FIG. 3A illustrates a screenshot showing an example of a user interface 300 displaying an interactive learning map. The user interface 300 includes a learning map graphic 302 and a palette 304. Similar to the learning map graphic 202 shown in FIG. 2A, each cell of the learning map graphic 302 can be color-coded or pattern-coded depending on performance results attained by a student or a group of students on assessment items for a corresponding learning objective. As shown in FIG. 3A, the learning map graphic 302 corresponds to a particular student. For example, a particular student can be selected from a list of students (not shown). As another example and as described in more detail below, a student can be selected using a histogram 305. The color-coding of the learning map graphic 302 may indicate a level of performance of the student on one or more assessment items for a corresponding learning objective. For example, cells 306 and 308 are each colored green to illustrate the student has reached the mastery target of a respective learning objective.

The user interface 300 may also be used to display performance results for a class or other group of students. For example, a mastery level can be determined for each cell, for each student, and a class performance can be determined for each cell, such as based on the percentage of students at a particular mastery level. For example, if 85% of the students are at a mastery target for a particular cell, it can be determined that the class has also reached the mastery target.

Accordingly, the cell can be colored green or given some other indication of mastery level achievement, in the learning map graphic 302.

For some assessments, a single assessment may not provide data for each cell of the learning map. For example, a single assessment may provide data for some, but not all cells. When evaluating student performance, multiple sources of different types of assessment data can be used. Such an approach can result in population of more cells of the learning map with performance information than if data from a single assessment is used. As mentioned above, assessment types can include interim assessments, state assessments tests, national assessment tests, homework assignments, classwork assignments, class quizzes, diagnostic assessments, formative assessments, summative assessments, end of chapter tests or quizzes, exit ticket assessments, or other types of assessments.

Assessments used to populate a learning map can be selected using a timeline control 309 included in the palette 304. The timeline control 309 displays date indicators and also displays multiple assessment indicators 310, where each assessment indicator 310 is displayed at a position on the timeline 309 corresponding to the date that an associated assessment was conducted. For example, an assessment indicator 310a indicates that a homework assessment occurred on 8/31, an assessment indicator 310b indicates that an ad-hoc assessment occurred on 9/10, and an assessment indicator 310c indicates that a benchmark test assessment occurred on 10/2.

A user can select an assessment indicator 310 to populate the learning map with performance information for the associated assessment. The user can select multiple assessment indicators 310 to populate the learning map with performance information for multiple assessments. To select multiple assessment indicators 310, the user can, for example, press a "control" key while selecting each of multiple assessment indicators 310.

The histogram 305 indicates a distribution of performance results for the selected assessment(s), for the class that includes the selected student. Each rectangle included in the histogram 305 represents a student in the class. A selected rectangle 312 represents the selected student. The horizontal placement of the rectangle 312 indicates the performance of the student on the selected assessment(s), and the color of the rectangle 312 represents a mastery level of the student's performance (e.g., met mastery target, approaching mastery target, failed mastery target). A different rectangle can be selected to view details corresponding to performance of another student.

In some implementations, to select assessments, the user can select and position a slider control 313 on the timeline control 309. For example, the slider control 313 is currently positioned on the timeline control 309 at a position corresponding to a date of 8/20. In this example, all available assessments with a date after the date associated with the slider control 313 can be used to populate the learning map with performance information. For example, the assessments associated with assessment indicators 310a, 310b, and 310c can be automatically selected since they are to the right of the slider control 313. The user can move the slider control 313 to a different date to select assessments occurring after that date.

Figure 3B:
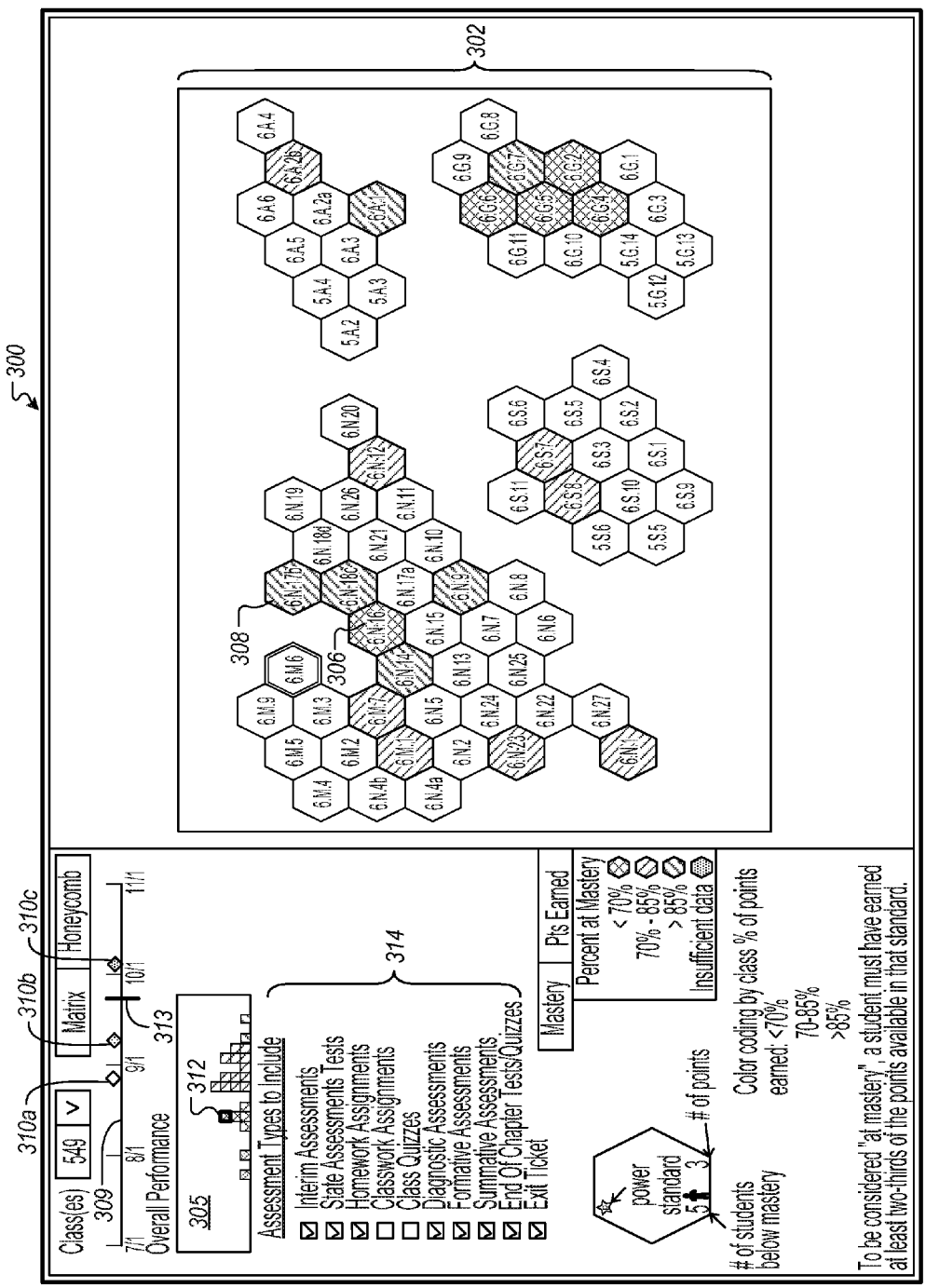

For example and referring to FIG. 3B, a user can move the slider control 313 on the timeline control 309 so that the slider control 313 is after the assessment indicators 310a and 310b and before the assessment indicator 310c. In this example, the assessment corresponding to the assessment indicator 310c, but not the assessments corresponding to the assessment indicators 310a and 310b, is used to populate the learning map.

Performance results for a given cell may change as the selection of assessments changes, and performance indicators (e.g., coloring) of the learning map may be correspondingly updated. For example, while the cell 306 shown in FIG. 3A indicates mastery of the associated learning objective based on the assessments corresponding to selected assessment indicators 310a, 310b, and 310c, the red color of the corresponding cell 306 shown in FIG. 3B indicates that the student failed mastery of the learning objective based on performance of the benchmark test assessment associated with the selected assessment indicator 310c.

The histogram 305 shown in FIG. 3B shows information about the performance on the benchmark test assessment corresponding to the assessment indicator 310c, for the class including the student. The histogram 305 shown in FIG. 3B displays a different distribution than the histogram 305 shown in FIG. 3A, since the histogram 305 shown in FIG. 3A displays a distribution corresponding to class performance on a different set of assessments (e.g., assessments corresponding to assessment indicators 310a, 310b, and 310c).

In some implementations, a set of controls 314 can be used to configure which types of assessments are used to populate the learning map with performance information. A user can use the controls 314 to select or deselect one or more assessment types. For instance, the example of the controls 314 shown in FIG. 3B indicate that classwork assignments and class quizzes are not selected. In implementations where both the timeline control 309 and the controls 314 are used, an assessment may be selected for populating the learning map if the assessment occurs on a date after the date represented by the slider control 313 and if the controls 314 indicate that the type of the assessment is selected.

For each question on each of the selected assessments, the learning objective(s) to which the question relates can be determined. Performance information for a particular cell can be determined by analyzing performance information for one or more related questions included on one or more assessments. In some implementations, each question is weighted equally, regardless of the type of question and regardless of which assessment includes the question. In some implementations, some questions and some assessments are weighted differently. Weighting is described in more detail below with respect to FIG. 5.

Figure 4A:
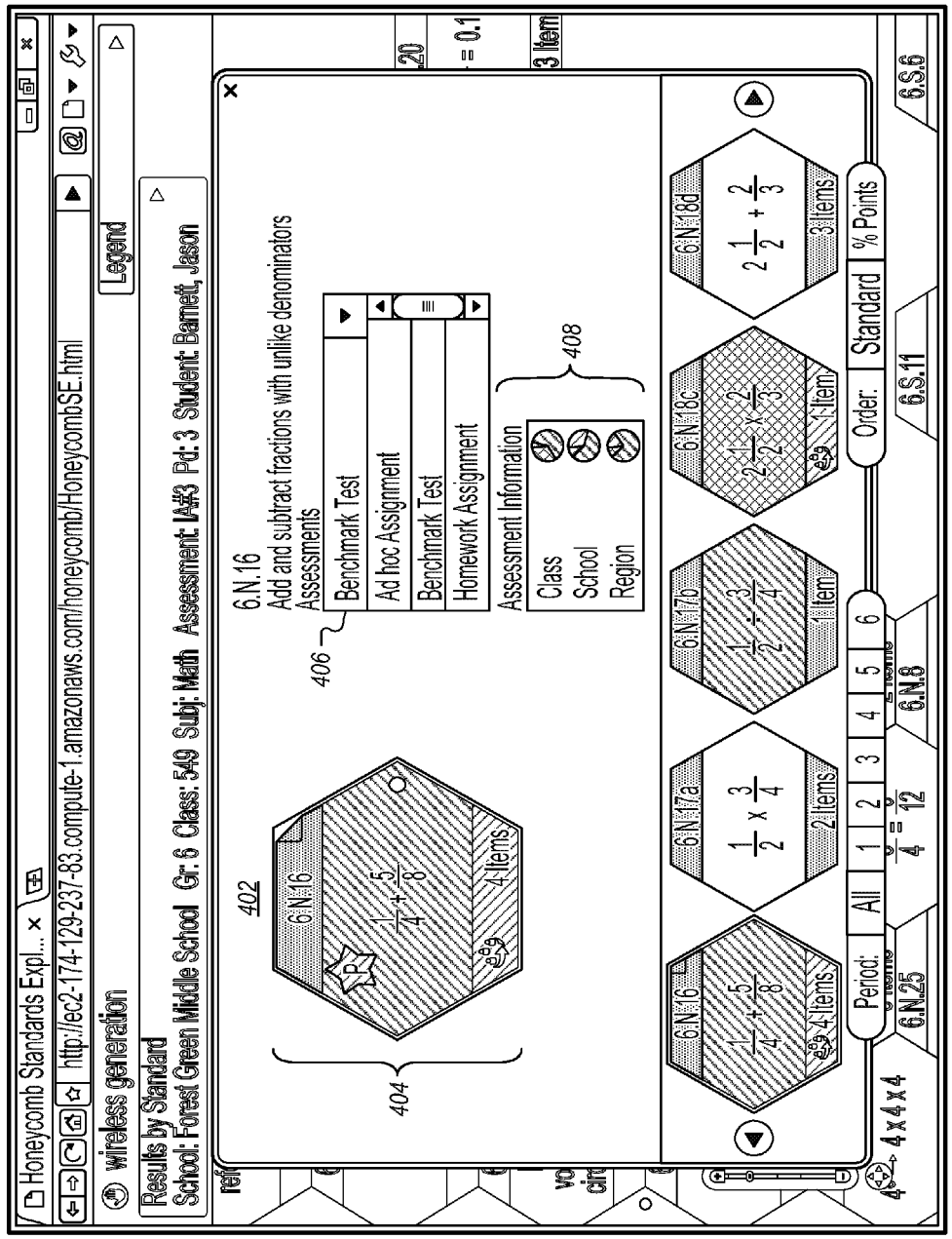

As mentioned, multiple, different types of assessments may be used to populate performance information for a particular cell of the learning map. A cell may be selected to view details related to a particular assessment or assessments. For example, FIG. 4A illustrates an example screenshot showing an overlay 402 related to cell 306. The overlay 402 can be navigated to, for example, by selecting the cell 306 shown in FIG. 3A, for instance, by clicking a mouse over the icon 306. In the particular example shown, the cell 306 and related overlay 402 correspond to a learning objective with identifier "6.N.16" relating to adding and subtracting fractions with unlike denominators. The overlay 402 can show information relating to a particular student with respect to this learning objective. The overlay 402, or similar overlay, may provide the same, or similar, functionality with respect to a group of students.

The overlay 402 includes a graphic 404 of the cell 306. The green color of the graphic 404 indicates that the student achieved mastery of the associated learning objective based on performance results of the selected assessments. An assessment selection control 406 lists assessments that are used to determine performance for the learning objective. For example, the assessment selection control 406 indicates that performance determination is based on an ad-hoc assignment, a benchmark test, and a homework assignment. That is, each of the assessments associated with the assessment indicators 310a, 310b, and 310c shown in FIG. 3A relate to the learning objective associated with the cell 306. As discussed below, for some learning objectives, some available assessments may not relate to the learning objective and are therefore not listed in the assessment selection control 406.

The user can select an assessment from the assessment selection control 406 to view information about the selected assessment. For example, an assessment information area 408 shows, for a selected benchmark test assessment, charts showing a performance distribution for the selected class, the school including the class, and the region associated with the school. Other assessment information may be shown in or may be accessible from the assessment information area 408. For example, assessment questions and answers may be shown, such as in a manner similar to FIGS. 2E and 2I-2K as described above. In further detail, in place of or in addition to distribution charts, questions on the selected assessment that relate to the learning objective of the cell can be displayed, along with the student's answers to the questions and correct or expected answers to the questions.

Figure 4B:
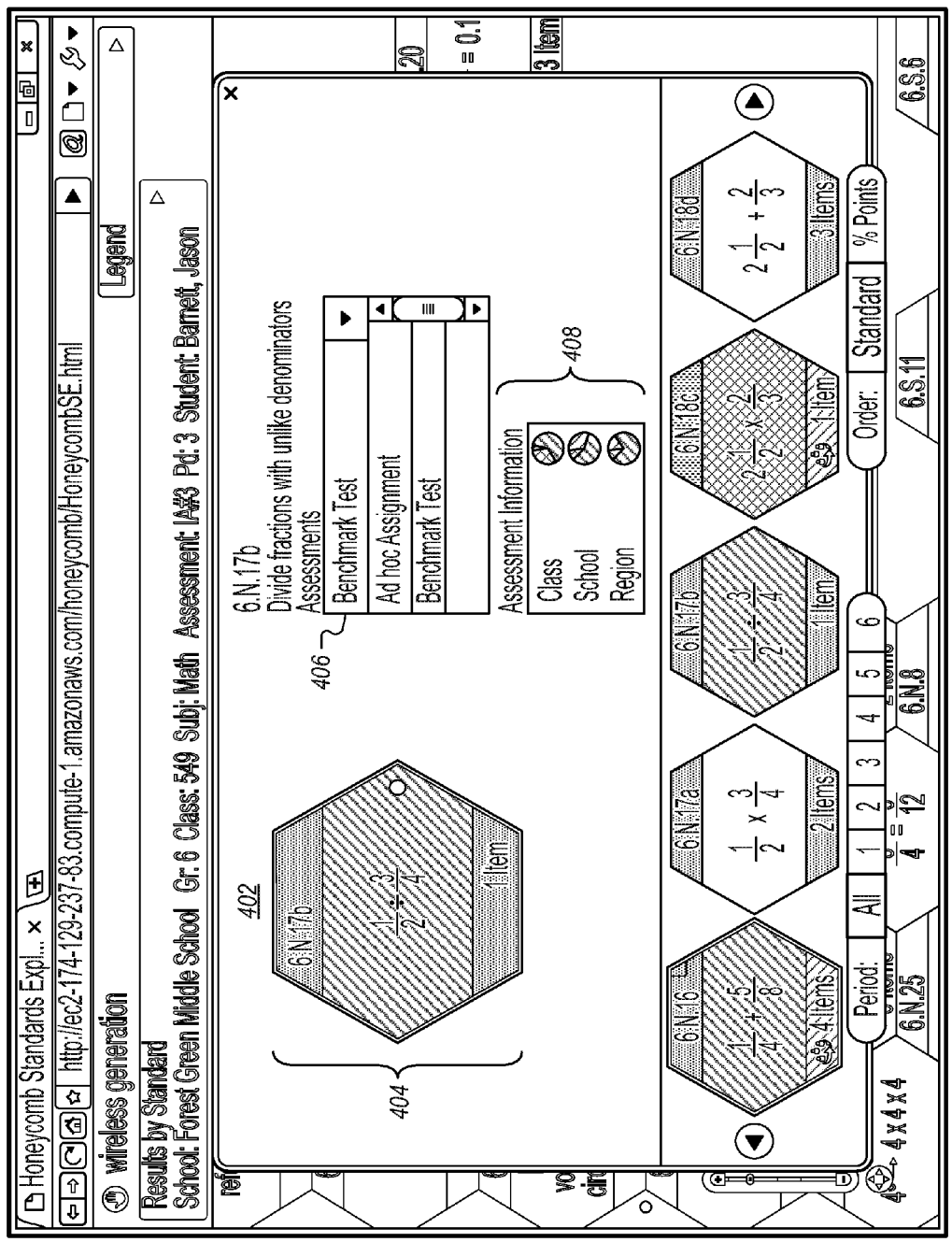

As another example, FIG. 4B illustrates an example screenshot showing the overlay 402 in association with cell 308. The overlay 402 can be navigated to, for example, by selecting the cell 308 shown in FIG. 3A. The overlay 402 shown in FIG. 4B illustrates details about a learning objective with identifier "6.N.17b" relating to dividing fractions with unlike denominators. The green color of the graphic 404 indicates that the student achieved mastery of the associated learning objective based on performance results of the selected assessments.

The assessment selection control 406 lists assessments that are used to determine performance for the learning objective. For example, the assessment selection control 406 indicates that performance determination is based on an ad-hoc assignment and a benchmark test. Notably, a homework assessment associated with the assessment indicator 310a shown in FIG. 3A is not displayed in the assessment selection control 406, indicating that the homework assessment does not relate to the learning objective "6.N.17b". In general, the number and type of assessments used for a particular cell may differ from the number and type of assessments used for a different cell.

Figure 5:
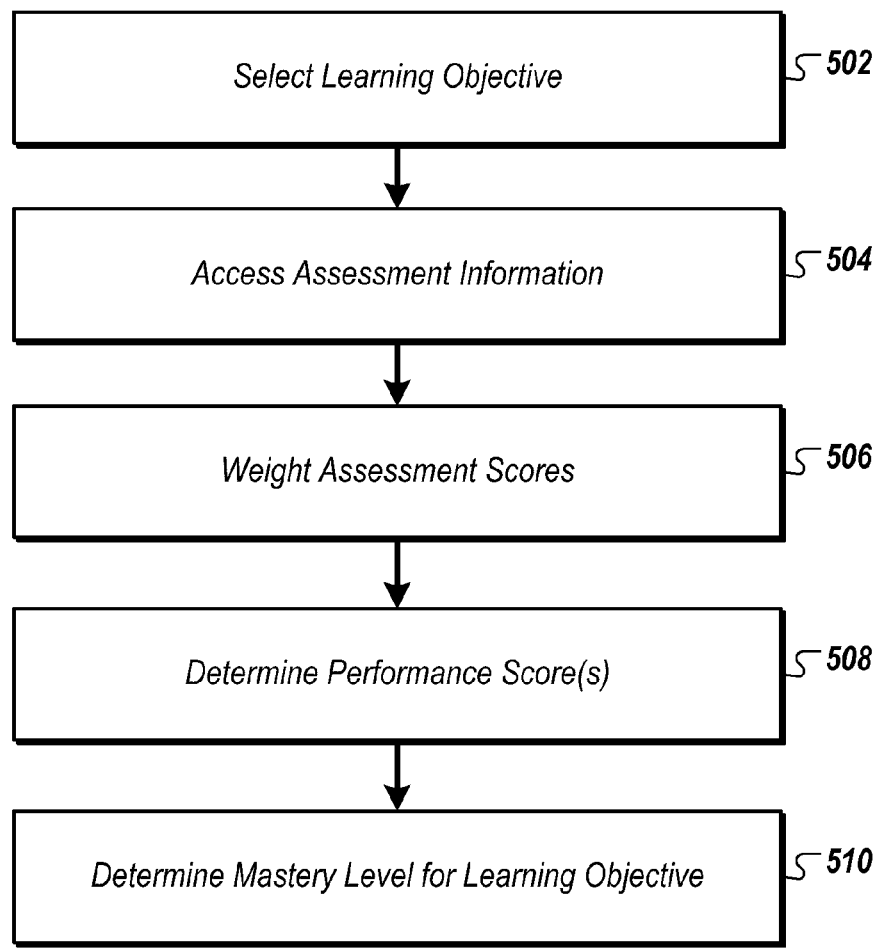
FIG. 5 is a flow chart showing an example of a process for determining mastery of a learning objective based on multiple assessments.

FIG. 5 is a flow chart showing an example of a process 500 for determining mastery of a learning objective based on multiple assessments. The process 500 can be performed by, for example, the server system 102, and for clarity of presentation, the description that follows uses the system 100 as the basis for describing the process 500. However, another system, or combination of systems, may be used to perform the process 500.

The server system 102 selects a learning objective (502). The server system 102 may, for example, select a learning objective in response to user input. For example, a teacher may, using an interface displayed on the teacher client system 104, select a particular cell of a learning map, where the cell is associated with a particular learning objective. As another example, a teacher may, using an interface displayed on the teacher client system 104, initiate a change of one or more parameters (e.g., assessments, student, class or other student grouping) affecting display of performance information in a learning map, resulting in the population of performance information for each cell of the learning map, to correspond to the change of parameters. Each cell may be selected in turn. That is, a particular cell may be selected, and the process 500 may be performed for the selected cell, and subsequently for each cell of the learning map.

The server system 102 may select a learning objective other than in response to user input. For example, the server system 102 may select a learning objective on a periodic basis (e.g., every minute, hourly, daily) as part of an automatic, periodic process used to update a learning map. As another example, the server system 102 may select a learning objective in response to receiving new assessment information.

The server system 102 accesses assessment information (504). For example, the server system 102 may access assessment information 112a-112d, such as from the repository 118. Each assessment information 112a-112d can include information for a different type of assessment. The server system 102 may identify which assessments pertain to the selected learning objective. Additionally, for each assessment which pertains to the selected learning objective, the server system 102 may identify which question(s) of the assessment pertain to the selected learning objective. The server system 102 may consult a mapping table to identify which assessments and/or which questions pertain to the selected learning objective.

The server system 102 may determine whether performance data is to be determined for a student or for a group of students. If performance data is to be determined for a particular student, the server system 102 may access assessment data for the student, for the assessments and/or questions which pertain to the selected learning objective. If performance data is to be determined for a group of students, the server system 102 may access assessment data for each student, for the assessments and/or questions which pertain to the learning objective.

The server system weights assessment scores for the assessment items on the assessments related to the selected learning objective (506). In general, assessment scores may be weighted based on how well an assessment item indicates a student's mastery of the selected learning objective. For example, a weight assigned to assessment items in a high stakes test may be higher than a weight assigned to assessment items in a homework assessment. As another example, the server system 102 may weight newer assessments higher than older assessments. For example, assignments that are less than two weeks old may be weighted at 100%, assignments between two and four weeks old may be weighted at 80%, assignments between four and six weeks old may be weighted at 60%, and assignments older than six weeks may be weighted at 0%. Assessment items that are considered to be a better differentiator of a student's performance on the selected learning objective relative to other assessment items may be weighted more than those other assessment items.

Assessments and/or individual assessment items may be weighted based on difficulty. For example, a mapping can be used that identifies a score for an assessment or question which indicates mastery. For example, for some assessments or questions, mastery may be identified as a score of 90%, whereas for other, more difficult assessments, mastery may be identified as a score of 70%. Rasch modeling can be used for weighting scores based on difficulty.

The server system 102 determines overall performance score(s) (508). For example, the server system 102 may, for each student, determine a total weighted score for the selected learning objective based on the weighted scores for the assessment items related to the selected learning objective, and determine a total weighted possible score for those same assessment items. The server system 102 may, for each student, determine an overall performance score for the student by calculating a ratio of the total weighted score to the total weighted possible score. As an example, suppose there are two assessment items related to the learning objective, with one having a total possible points of 5 and the other having a total possible points of 1, and that the weight applied to the first assessment item is 100% (or 1) and the weight applied to the second assessment item is 80% (or 0.8). Suppose also that the student achieved 3 points on the first assessment item and 1 point on the second assessment item. The server system 102 may then determine the overall performance score for the selected learning objective as (1*3+0.8*1)/(1*5+0.8*1), which is equal to 0.66.

The server system 102 determines a mastery level for the learning objective, for example, based on the overall performance score (510). If performance data is to be determined for a single student, the server system 102 may compare the overall performance score for the student to one or more threshold scores, where a threshold score indicates a particular mastery level. For example, a threshold score of 85% may indicate a mastery level, meaning scores at or above the threshold of 85% indicate mastery of the learning objective. A threshold score of 70% may indicate approaching a mastery level, meaning scores at or above 70% but less than 85% indicate approaching master level and also meaning scores below 70% indicate failure to obtain mastery of the learning objective.

If performance data is to be determined for a group of students, a mastery level for the group may be determined. As described above, calculating mastery level for a group may be defined in terms of the percentage of students who met a threshold or may be based on an average points per student in the group.

Figure 6:
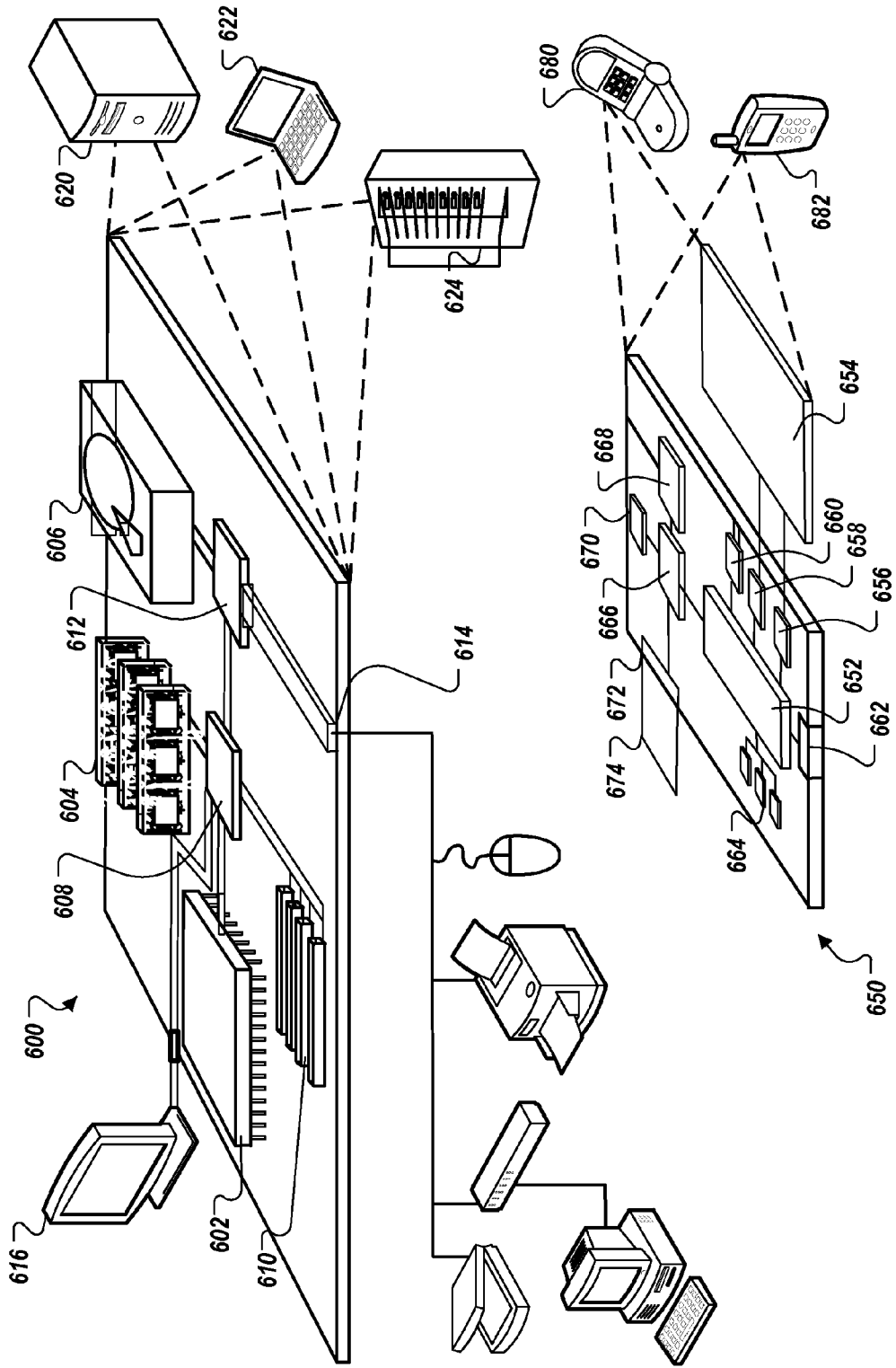
FIG. 6 shows examples of generic computer devices that may be used to execute the actions discussed in this document.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, tablets, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various buses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer-readable or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display), an OLED (Organic Light Emitting Diode) display, or an electronic ink display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 may be implemented as one or more of a computer-readable medium or media, a volatile memory unit or units, or a non-volatile memory unit or units. Expansion memory 674 may also be provided and connected to device 650 through expansion interface 672, which may include, for instance, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.), and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, a laptop, or other similar mobile device. In some implementations, the computing device 650 may be implemented in a non-mobile computing device such as a desktop, multiple servers, or other similar non-mobile device.

Device 650 may also include one or more different devices that are capable of sensing motion. Examples include, but are not limited to, accelerometers and compasses. Accelerometers and compasses, or other devices that are capable of detecting motion or position are available from any number of vendors and may sense motion in a variety of ways. For example, accelerometers may detect changes in acceleration while compasses may detect changes in orientation respective to the magnetic North or South Pole. These changes in motion may be detected by the device 650 and used to update the display of the respective devices 650 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing system comprising:
    one or more processing devices; and
    one or more storage devices storing instructions that, when executed by one or more processing devices, cause the one or more processing devices to:
        display one or more learning map interfaces, the learning map interfaces including a selection control configured to allow a user to select a time frame during which a subset of assessments from a set of assessments were administered to a student, the subset including less assessments than the set;
        receive a selection from the user using the selection control, the selection indicating the time frame;
        access assessment information for the student, the assessment information including information related to assessments in the subset;
        populate a learning map with the performance information for the student, the learning map including a plurality of cells, each cell corresponding to a learning objective and the plurality of cells being arranged in a manner that reflects a relationship between the learning objectives corresponding to the cells, wherein, to populate the learning map with performance information, the instructions cause the one or more processing devices to;
            determine, for each assessment in the subset and for each assessment item on a given assessment in the subset, a learning objective that is associated with the assessment item, including determining a first set of assessment items associated with a first learning objective and a second set of assessment items associated with a second learning objective, wherein the first set of assessment items includes different assessment items than the second set of assessment items;
            determine a first performance level, from among multiple performance levels, of the student based on the first set of assessment items;
            modify a first one of the cells to include a first indication of the first performance level, the first cell corresponding to the first learning objective;
            determine a second performance level, from among the multiple performance levels, of the student based on the second set of assessment items; and
            modify a second one of the cells to include a second indication of the second performance level, the second cell corresponding to the second learning objective; and
        display one or more learning map interfaces, the learning map interfaces being configured to display the learning map populated with the performance information.

2. The system of claim 1 wherein the selection control comprises a timeline control that allows a user to select a time such that assessments in the set of assessments administered to the student after the selected time are included in the subset of assessments and assessments in the set of assessments before the selected time are not included in the subset.

3. The system of claim 1 wherein the subset of assessments includes multiple, different types of assessments.

4. The system of claim 1 wherein, to determine the first performance level, the instructions include instructions that cause the one or more processing devices to:
    access a set of assessment scores corresponding to the first set of assessment items;
    apply weights to the accessed assessment scores to generate weighted assessment scores;
    determine the first performance level based on the weighted assessment scores.

5. The system of claim 4 wherein the weights vary based on a time at which the assessment items were administered to the student.

6. The system of claim 4 wherein the weights vary based on a difficulty of the assessments items.

7. The system of claim 4 wherein the weights vary based on an importance of the assessment on which the assessment items were administered.

8. The system of claim 1 wherein the weights vary based on how well the assessment items differentiate mastery levels.

9. A method comprising:
    displaying, on a display device, one or more learning map interfaces, the learning map interfaces including a selection control configured to allow a user to select a time frame during which a subset of assessments from a set of assessments were administered to a student, the subset including less assessments than the set;
    receiving, using one or more processing devices, a selection from the user using the selection control, the selection indicating the time frame;
    accessing, using the processing device, assessment information for the student, the assessment information including information related to assessments in the subset;
    populating, using the processing devices, a learning map with the performance information for the student, the learning map including a plurality of cells, each cell corresponding to a learning objective and the plurality of cells being arranged in a manner that reflects a relationship between the learning objectives corresponding to the cells, wherein populating the learning map with performance information includes:
        determining, using the processing devices and for each assessment in the subset and for each assessment item on a given assessment in the subset, a learning objective that is associated with the assessment item, including determining a first set of assessment items associated with a first learning objective and a second set of assessment items associated with a second learning objective, wherein the first set of assessment items includes different assessment items than the second set of assessment items;

determining, using the processing devices, a first performance level, from among multiple performance levels, of the student based on the first set of assessment items;

modifying, using the processing devices, a first one of the cells to include a first indication of the first performance level, the first cell corresponding to the first learning objective;

determining, using the processing devices, a second performance level, from among the multiple performance levels, of the student based on the second set of assessment items; and modifying, using the processing devices, a second one of the cells to include a second indication of the second performance level, the second cell corresponding to the second learning objective; and displaying, on the display device, one or more learning map interfaces, the learning map interfaces being configured to display the learning map populated with the performance information.

10. The method of claim 9 wherein the selection control comprises a timeline control that allows a user to select a time such that assessments in the set of assessments administered to the student after the selected time are included in the subset of assessments and assessments in the set of assessments before the selected time are not included in the subset.

11. The method of claim 9 wherein the subset of assessments includes multiple, different types of assessments.

12. The method of claim 9 wherein determining the first performance level includes:

accessing, using the processing devices a set of assessment scores corresponding to the first set of assessment items;

applying weights, using the processing devices, to the accessed assessment scores to generate weighted assessment scores;

determining, using the processing devices, the performance level based on the weighted assessment scores.

13. The method of claim 12 wherein the weights vary based on a time at which the assessment items were administered to the student.

14. The method of claim 12 wherein the weights vary based on a difficulty of the assessments items.

15. The method of claim 12 wherein the weights vary based on an importance of the assessment on which the assessment items were administered.

16. The method of claim 9 wherein the weights vary based on how well the assessment items differentiate mastery levels.

* * * * *